(12) United States Patent
Takeuchi et al.

(10) Patent No.: US 7,176,609 B2
(45) Date of Patent: *Feb. 13, 2007

(54) HIGH EMISSION LOW VOLTAGE ELECTRON EMITTER

(75) Inventors: Yukihisa Takeuchi, Nishikamo-gun (JP); Tsutomu Nanataki, Toyoake (JP); Iwao Ohwada, Nagoya (JP); Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 256 days.

This patent is subject to a terminal disclaimer.

(21) Appl. No.: 10/730,754

(22) Filed: Dec. 8, 2003

(65) Prior Publication Data

US 2005/0073233 A1 Apr. 7, 2005

Related U.S. Application Data

(63) Continuation-in-part of application No. 10/678,958, filed on Oct. 3, 2003, now abandoned.

(30) Foreign Application Priority Data

Oct. 3, 2003 (JP) .............................. 2003-345992

(51) Int. Cl.
*H01J 1/304* (2006.01)
*H01J 1/30* (2006.01)

(52) U.S. Cl. .................. 313/311; 313/310; 315/169.1; 315/169.3

(58) Field of Classification Search ........ 313/301–311, 313/495; 315/169.3, 169.1
See application file for complete search history.

(56) References Cited

U.S. PATENT DOCUMENTS

| | | | |
|---|---|---|---|
| 5,280,221 A | 1/1994 | Okamoto et al. | |
| 5,453,661 A | 9/1995 | Auciello et al. | |
| 5,508,590 A | 4/1996 | Sampayan et al. | |
| 5,631,664 A * | 5/1997 | Adachi et al. | 345/74.1 |
| 5,666,019 A | 9/1997 | Potter | |
| 5,726,524 A | 3/1998 | Debe | |
| 5,729,094 A | 3/1998 | Geis et al. | |

(Continued)

FOREIGN PATENT DOCUMENTS

DE 3833604 4/1990

(Continued)

OTHER PUBLICATIONS

U.S. Appl. No. 10/808,258, filed Mar. 24, 2004, Takeuchi et al.

(Continued)

*Primary Examiner*—Karabi Guharay
(74) *Attorney, Agent, or Firm*—Burr & Brown

(57) ABSTRACT

An electron emitter has an emitter made of a dielectric material, and an upper electrode and a lower electrode to which a drive voltage is applied to emit electrons. The upper electrode is formed on a first surface of the substance serving as the emitter, and the lower electrode is formed on a second surface of the substance serving as the emitter. The upper electrode has a plurality of through regions through which the emitter is exposed. The upper electrode has a surface which faces the emitter in peripheral portions of the through regions and which is spaced from the emitter.

21 Claims, 39 Drawing Sheets

U.S. PATENT DOCUMENTS

| | | | |
|---|---|---|---|
| 5,747,926 | A | 5/1998 | Nakamoto et al. |
| 5,874,802 | A | 2/1999 | Choi et al. |
| 5,877,594 | A | 3/1999 | Miyano et al. |
| 5,990,605 | A | 11/1999 | Yoshikawa et al. |
| 6,040,973 | A | 3/2000 | Okamoto et al. |
| 6,153,978 | A | 11/2000 | Okamoto |
| 6,157,145 | A | 12/2000 | Vollkommer et al. |
| 6,184,612 | B1 | 2/2001 | Negishi et al. |
| 6,198,225 | B1 | 3/2001 | Kano et al. |
| 6,274,881 | B1 | 8/2001 | Akiyama et al. |
| 6,285,123 | B1 | 9/2001 | Yamada et al. |
| 6,313,815 | B1 | 11/2001 | Takeda et al. |
| 6,359,383 | B1 | 3/2002 | Chuang et al. |
| 6,452,328 | B1 | 9/2002 | Saito et al. |
| 6,469,452 | B2 | 10/2002 | Seo et al. |
| 6,479,924 | B1 | 11/2002 | Yoo |
| 6,580,108 | B1 | 6/2003 | Utsumi et al. |
| 6,882,100 | B2 | 4/2005 | Chen et al. |
| 6,911,768 | B2 | 6/2005 | Chen et al. |
| 6,946,800 | B2 * | 9/2005 | Takeuchi et al. ......... 315/169.3 |
| 2002/0060516 | A1 | 5/2002 | Kawate et al. |
| 2002/0153827 | A1 | 10/2002 | Takeuchi et al. |

FOREIGN PATENT DOCUMENTS

| | | |
|---|---|---|
| DE | 10057072 | 5/2001 |
| EP | 0 353 632 | 2/1990 |
| EP | 428853 | 5/1991 |
| EP | 0 953 958 A2 | 11/1999 |
| FR | 2639151 | 5/1990 |
| FR | 2675306 | 10/1992 |
| FR | 2789221 | 8/2000 |
| FR | 2789223 | 8/2000 |
| JP | 44-26125 | 11/1969 |
| JP | 46-20944 | 6/1971 |
| JP | 59-208587 | 11/1984 |
| JP | 63-150837 A | 6/1988 |
| JP | 1-311533 A | 12/1989 |
| JP | 05-325777 | 12/1993 |
| JP | 06-103886 | 4/1994 |
| JP | 7-147131 A | 6/1995 |
| JP | 08-111166 | 4/1996 |
| JP | 09-090882 A | 4/1997 |
| JP | 10-27539 A | 1/1998 |
| JP | 10-241553 | 9/1998 |
| JP | 11-185600 | 7/1999 |
| JP | 11-288249 A | 10/1999 |
| JP | 2000-285801 A | 10/2000 |
| JP | 2000-310970 A | 11/2000 |
| JP | 3160213 B2 | 2/2001 |
| JP | 3214256 | 7/2001 |
| WO | 02/052600 A1 | 7/2002 |

OTHER PUBLICATIONS

U.S. Appl. No. 10/919,747, filed Aug. 17, 2001, Takeuchi et al.
U.S. Appl. No. 10/901,932, filed Jul. 29, 2004, Takeuchi et al.
U.S. Appl. No. 10/919,678, filed Aug. 17, 2004, Takeuchi et al.
U.S. Appl. No. 10/951,509, filed Sep. 28, 2004, Takeuchi et al.
U.S. Appl. No. 10/950,976, filed Sep. 27, 2004, Takeuchi et al.
U.S. Appl. No. 10/952,524, filed Sep. 28, 2004, Takeuchi et al.
U.S. Appl. No. 10/951,832, filed Sep. 28, 2004, Takeuchi et al.
G. Benedek et al., "Electron Emission From Ferroelectric/Antiferroelectric Cathodes Excited by Short High-Voltage Pulses", Journal Applied Physics, vol. 81, No. 3, Feb. 1, 1997, pp. 1396-1403.
Gundel, H. et al., "Low Pressure Hollow Cathode Switch Triggered by a Pulsed Electron Beam Emitted From Ferroelectrics", Applied Physics Letter, American Institute of Physics, New York, US vol. 54, No. 21, May 22, 1989, pp. 2071-2073.
Gundel, H. et al., "Time-Dependent Electron Emission From Ferroelectrics by External Pulsed Electric Fields", Journal of Applied Physics, American Institute of Physics, New York, US vol. 69, No. 2, Jan. 15, 1991, pp. 975-982.
U.S. Appl. No. 10/374,955, filed Feb. 25, 2003, Takeuchi et al.
U.S. Appl. No. 10/459,415, filed Jun. 11, 2003, Takeuchi et al.
U.S. Appl. No. 10/459,110, filed Jun. 11, 2003, Takeuchi et al.
U.S. Appl. No. 10/459,416, filed Jun. 11, 2003, Takeuchi et al.
U.S. Appl. No. 10/459,386, filed Jun. 11, 2003, Takeuchi et al.
U.S. Appl. No. 10/647,794, filed Aug. 25, 2003, Takeuchi et al.
U.S. Appl. No. 10/673,384, filed Sep. 26, 2003, Takeuchi et al.
U.S. Appl. No. 10/671,763, filed Sep. 26, 2003, Takeuchi et al.
U.S. Appl. No. 10/699,186, filed Oct. 31, 2003, Takeuchi et al.
U.S. Appl. No. 10/719,521, filed Nov. 21, 2003, Takeuchi et al.
U.S. Appl. No. 10/719,596, filed Nov. 21, 2003, Takeuchi et al.
U.S. Appl. No. 10/731,901, filed Dec. 9, 2003, Takeuchi et al.
"Pulsed Electron Source Using a Ferroelectric Cathode," Tokyo Institute of Technology, vol. 68, No. 5, Jan. 7, 1999, pp. 546-550.
Puchkarev, Victor F. and Mesyats, Gennady A., "On the Mechanism of Emission from the Ferroelectric Ceramic Cathode," Journal of Applied Physics, vol. 78, No. 9, Nov. 1, 1995, pp. 5633-5637.
Riege, H., "Electron Emission from Ferroelectrics—a Review," Nucl. Instr. and Meth. A340, 1994, pp. 80-89.
Masatoshi Miyake et al., "Electron Emission from Ferroelectric Cathodes Excited by Pulsed Voltage," Tokyo Institute of Technology, vol. 119, No. 5, 1999 pp. 622-627.
Kanemaru, Seigou, "Featuring: All About Flat Displays 2000, Leading Technological Trend of FEDs," Electronic Engineering, Nikkan Kogyo Shimbun, Ltd., Jul. 2000, pp. 38-41 (with partial translation).

* cited by examiner

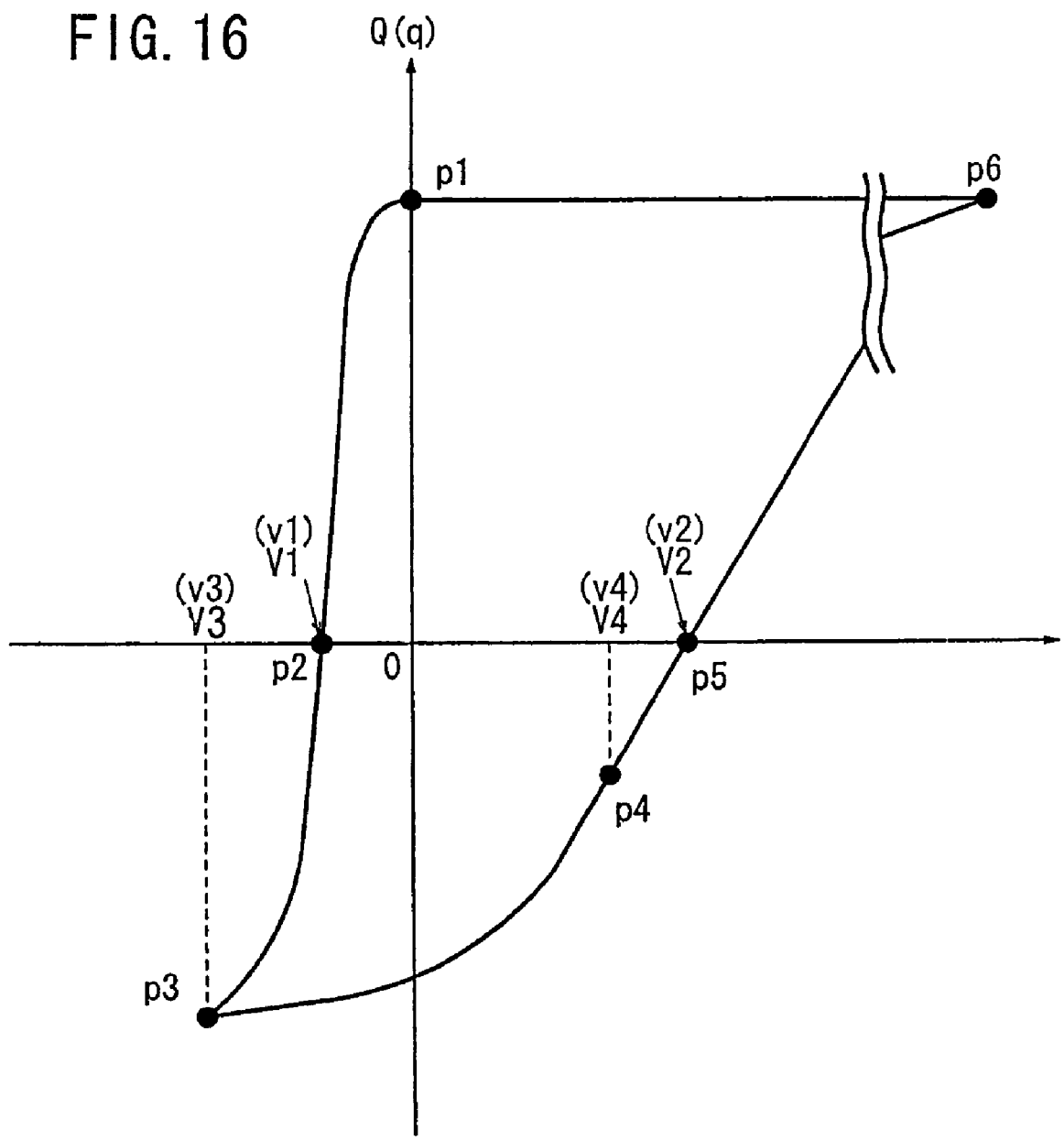

FIG. 32

|  | | CHARGE ACCUMULATION PERIOD | | LIGHT EMISSION PERIOD |
|---|---|---|---|---|
|  | | ON | OFF |  |
|  | | 0~30[V] | 50[V] | 0[V] |
| SELECTED | 50[V] | -50~-20[V] | 0[V] | |
| UNSELECTED | 0[V] | 0~30[V] | 50[V] | |
| ALL SELECTED | -350[V] | | | 350[V] |

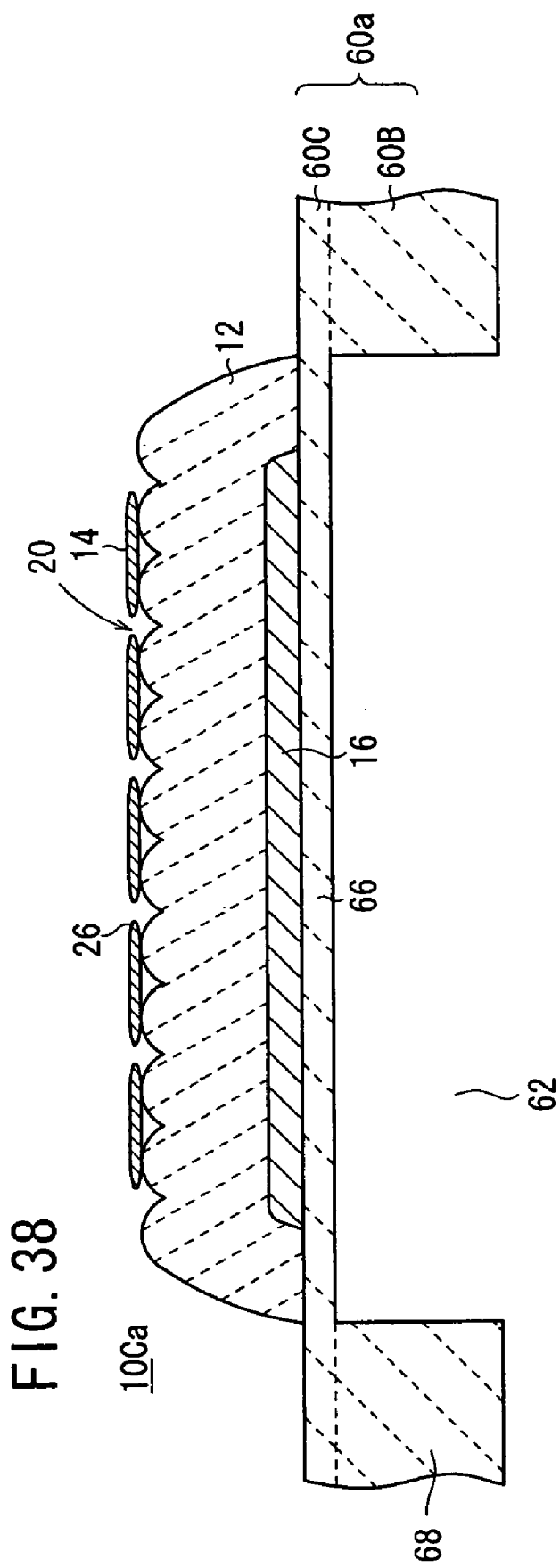

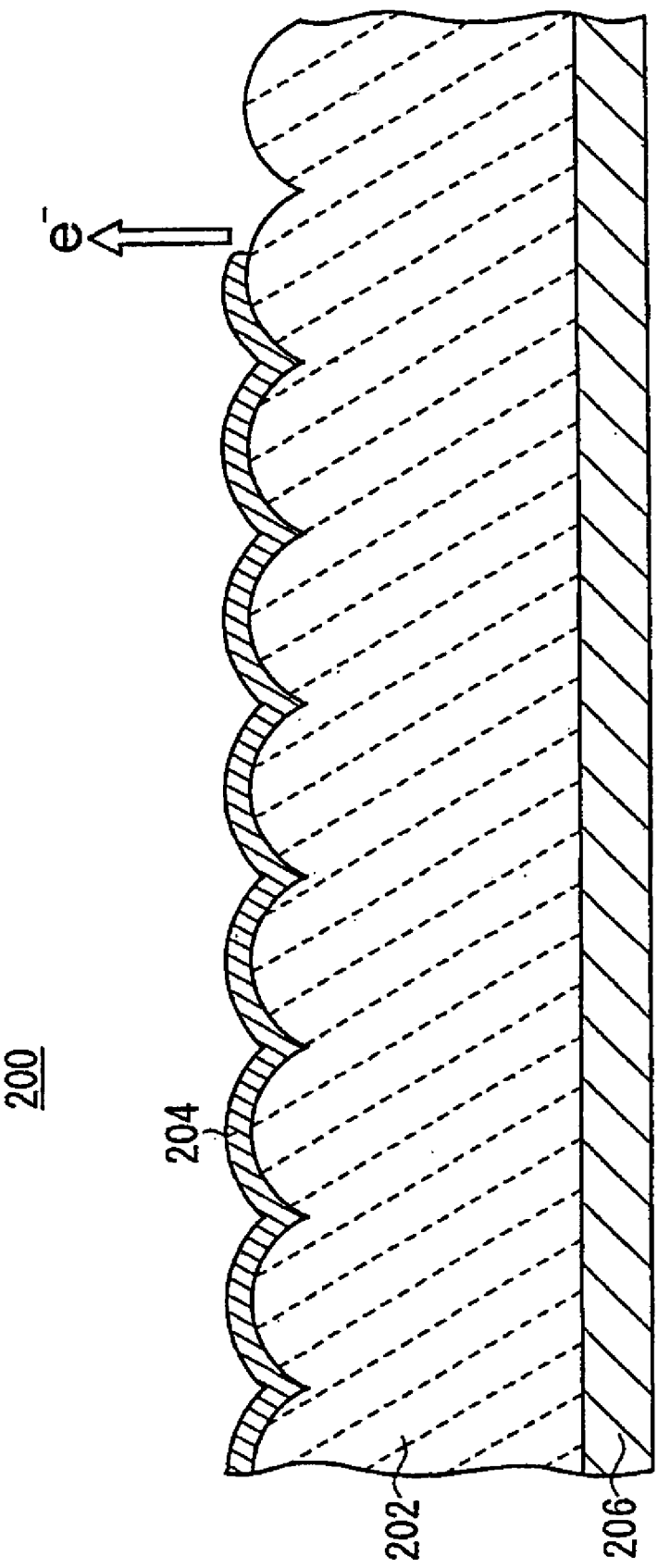
FIG. 39 - PRIOR ART

HIGH EMISSION LOW VOLTAGE ELECTRON EMITTER

CROSS REFERENCE TO RELATED APPLICATION

This application is a continuation-in-part application of U.S. application Ser. No. 10/678,958 filed Oct. 3, 2003 now abandoned, and claims the benefit of Japanese Application 2003-345992 filed Oct. 3, 2003, the entireties of which are incorporated herein by reference.

BACKGROUND OF THE INVENTION

1. Field of the Invention

The present invention relates to an electron emitter having a first electrode and a second electrode which are formed on a substance serving as an emitter.

2. Description of the Related Art

Recently, electron emitters having a cathode electrode and an anode electrode have been finding use in various applications such as field emission displays (FEDs) and backlight units. In an FED, a plurality of electron emitters are arranged in a two-dimensional array, and a plurality of phosphors are positioned in association with the respective electron emitters with a predetermined gap left therebetween.

Conventional electron emitters are disclosed in the following documents 1 through 5, for example. All of these disclosed electron emitters are disadvantageous in that no dielectric material is employed as a substance serving as an emitter, a forming process or a micromachining process is required between facing electrodes, a high voltage needs to be applied to emit electrons, and a panel fabrication process is complex and entails a high panel fabrication cost.

It has been considered to use a dielectric material as a substance serving as an emitter. Various theories about the emission of electrons from a dielectric material have been presented in the following documents 6 through 8:

[Document 1]
Japanese laid-open patent publication No. 1-311533
[Document 2]
Japanese laid-open patent publication No. 7-147131
[Document 3]
Japanese laid-open patent publication No. 2000-285801
[Document 4]
Japanese patent publication No. 46-20944
[Document 5]
Japanese patent publication No. 44-26125
[Document 6]
Yasuoka and Ishii, "Pulse electron source using a ferrodielectric cathode", J. Appl. Phys., Vol. 68, No. 5, p. 546–550 (1999)
[Document 7]
V. F. Puchkarev, G. A. Mesyats, On the mechanism of emission from the ferroelectric ceramic cathode, J. Appl. Phys., Vol. 78, No. 9, 1 Nov., 1995, p. 5633–5637
[Document 8]
H. Riege, Electron emission ferroelectrics—a review, Nucl. Instr. and Meth. A340, p. 80–89 (1994)

As shown in FIG. 39, when an upper electrode 204 and a lower electrode 206 are formed on a substance (emitter) 202 serving as an emitter in a conventional electron emitter 200, the upper electrode 204 in particular is formed in intimate contact with the emitter 202. A point where electric field concentrates is a triple point made up of the upper electrode 204, the emitter 202, and the vacuum, and corresponds to a peripheral edge portion of the upper electrode 204.

However, since the peripheral edge portion of the upper electrode 204 is held in intimate contact with the emitter 202, the arrangement suffers a problem in that the degree of electric field concentration is small and the energy required to emit electrons is small. Furthermore, because an electron emission region is limited to the peripheral edge portion of the upper electrode 204, the overall electron emission characteristics tend to vary, making it difficult to control the emission of electrons and also making the electron emission efficiency low.

SUMMARY OF THE INVENTION

The present invention has been made in view of the above drawbacks. It is an object of the present invention to provide an electron emitter which is capable of easily producing a high electric field concentration, providing many electron emission regions, emitting electrons with a large output and a high efficiency, and being driven at a low voltage.

Another object of the present invention to provide an electron emitter which can easily be applied to a display having a plurality of electron emitters arrayed in association with a plurality of pixels, for emitting electrons from the electron emitters to display an image.

An electron emitter according to the present invention is characterized by a substance serving as an emitter made of a dielectric material, and a first electrode and a second electrode to which a drive voltage is applied to emit electrons, the first electrode being formed on a first surface of the substance serving as the emitter, the second electrode being formed on a second surface of the substance serving as the emitter, at least the first electrode having a plurality of through regions through which the substance serving as the emitter is exposed, the first electrode having a surface which faces the substance serving as the emitter in peripheral portions of the through regions and which is spaced from the substance serving as the emitter.

First, a drive voltage is applied between the first electrode and the second electrode. The drive voltage is defined as a voltage, such as a pulse voltage or an alternating-current voltage, which abruptly changes, with time, from a voltage level higher or lower than a reference voltage (e.g., 0 V) to a voltage level that is lower or higher than the reference voltage.

A triple junction is formed in a region of contact between the first surface of the substance serving as the emitter, the first electrode, and a medium (e.g., a vacuum) around the electron emitter. The triple junction is defined as an electric field concentration region formed by a contact between the first electrode, the substance serving as the emitter, and the vacuum. The triple junction includes a triple point where the first electrode, the substance serving as the emitter, and the vacuum exist as one point. According to the present invention, the triple junction is formed by the peripheral portions of the through regions and the peripheral area of the first electrode. Therefore, when the drive voltage is applied between the first electrode and the second electrode, an electric field concentration occurs at the triple junction.

It is assumed that a period for outputting the voltage level higher or lower than the reference voltage is referred to as a first output period, and a period for outputting the voltage level lower or higher than the reference voltage as a second output period. In the first output period, an electric field concentration occurs at the triple junction, accumulating electrons in the portions of the substance serving as the emitter which correspond to the through regions of the first electrode and regions near the peripheral portion of the first electrode. At this time, the first electrode functions as an electron supply source.

In the next second output period, when the voltage level of the drive voltage is quickly changed, an electric field concentration in the opposite direction occurs at the triple junction referred to above, causing the portions of the substance serving as the emitter where electrons have been accumulated to emit electrons through the through regions. Electrons are also emitted from the portions near the outer peripheral portion of the first electrode.

According to another electron emission process, in a first output period, the electron emitter is prepared for electron emission (e.g., the substance serving as the emitter is polarized in one direction). In a next second output period, when the voltage level of the drive voltage is quickly changed, an electric field concentration occurs at the triple junction, causing the first electrode to emit primary electrons, which impinge upon the portions of the substance serving as the emitter which are exposed through the through regions and the regions near the outer peripheral portion of the first electrode. Secondary electrons (including reflected primary electrons) are emitted from the portions hit by the primary electrons. Thus, secondary electrons are emitted from the through regions and the regions near the outer peripheral portion of the first electrode in an initial stage of the second output period.

Since the first electrode of the electron emitter has the plural through regions, electrons are uniformly emitted from each of the through regions and the outer peripheral portions of the first electrode. Thus, any variations in the overall electron emission characteristics of the electron emitter are reduced, making it possible to facilitate the control of the electron emission and increase the electron emission efficiency.

According to the present invention, furthermore, because a gap is formed between the surface of the first electrode which faces the substance serving as the emitter in the peripheral portions of the through regions and the substance serving as the emitter, when the drive voltage is applied, an electric field concentration tends to be produced in the region of the gap. This leads to a higher efficiency of the electron emission, making the drive voltage lower (emitting electrons at a lower voltage level).

As described above, according to the present invention, since the gap is formed between the surface of the first electrode which faces the substance serving as the emitter in the peripheral portions of the through regions and the substance serving as the emitter, providing overhanging portions (flanges) on the peripheral portions of the through regions, electrons are easily emitted from the overhanging portions (the peripheral portions of the through regions) of the first electrode, also with the increased electric field concentration in the region of the gap. This leads to a larger output and higher efficiency of the electron emission, making the drive voltage lower. In either one of the process of emitting electrons accumulated in the substance serving as the emitter and the process of emitting secondary electrons by causing primary electrons from the first electrode to impinge upon the substance serving as emitter, as the peripheral portions of the through regions of the first electrode function as a gate electrode (a control electrode, a focusing electronic lens, or the like), the straightness of emitted electrons can be increased. This is effective in reducing crosstalk if a number of electron emitters are arrayed for use as an electron source of a display.

As described above, the electron emitter according to the present invention is capable of easily developing a high electric field concentration, provides many electron emission regions, has a larger output and higher efficiency of the electron emission, and can be driven at a lower voltage (lower power consumption).

In the above arrangement, at least the first surface of the substance serving as the emitter may have surface irregularities due to the grain boundary of the dielectric material, and the through regions of the first electrode may be formed in regions corresponding to concavities of the surface irregularities due to the grain boundary of the dielectric material.

The structure in which the surface of the first electrode which faces the substance serving as the emitter in the peripheral portions of the through regions, i.e., the structure in which the gap is formed between the surface of the first electrode which faces the substance serving as the emitter in the peripheral portions of the through regions and the substance serving as the emitter, can simply be achieved.

In the above arrangement, a maximum angle $\theta$ between the first surface of the substance serving as the emitter and the surface of the first electrode which faces the substance serving as the emitter in peripheral portions of the through regions should preferably be in the range of $1° \leq \theta \leq 60°$. In the above arrangement, a maximum distance d in the vertical direction between the first surface of the substance serving as the emitter and the surface of the first electrode which faces the substance serving as the emitter in peripheral portions of the through regions should preferably be in the range of $0 \ \mu m < d \leq 10 \ \mu m$. These arrangements make it possible to increase the degree of the electric field concentration in the region of the gap, resulting in a larger output and higher efficiency of the electron emission and making the drive voltage lower efficiently.

In the above arrangement, a floating electrode may exist in regions of the first surface of the substance serving as the emitter which correspond to the through regions. With this arrangement, since the floating electrode also serves as an electron supply source, a number of electrons can be emitted out through the through regions in the electron emission stage (the second output period referred to above).

In the above arrangement, the through regions may comprise holes. The portions of the substance serving as the emitter where the polarization is inverted or changed depending on the drive voltage applied between the first electrode and the second electrode include a portion (first portion) directly below the first electrode and a portion (second portion) corresponding to a region extending from the inner peripheral edges of the through regions inwardly of the through regions. Particularly, the second portion changes depending on the level of the drive voltage and the degree of the electric field concentration. According to the present invention, the average diameter of the holes should preferably be in the range from 0.1 μm to 10 μm. Insofar as the average diameter of the holes is in this range, the distribution of electrons emitted through the through regions is almost free of any variations, allowing electrons to be emitted efficiently.

If the average diameter of the hole is less than 0.1 μm, then the region where electrons are accumulated is made narrower, reducing the amount of emitted electrons. While one solution would be to form many holes, it would be difficult and highly costly to form many holes. If the average diameter of the holes is in excess of 10 μm, then the proportion (share) of the portion (second portion) which contributes to the emission of electrons in the portion of the substance serving as the emitter that is exposed through the through regions is reduced, resulting in a reduction in the electron emission efficiency.

In the above arrangement, the through regions may comprise recesses or comb-toothed recesses. The recesses should preferably have an average width in the range from 0.1 µm to 10 µm.

In the above arrangement, the through regions may comprise slits having an optional shape. The slits should preferably have an average width in the range from 0.1 µm to 10 µm.

An electron emitter according to the present invention is characterized by a substance serving as an emitter made of a dielectric material, a first electrode formed in contact with a first surface of the substance serving as the emitter, a second electrode formed in contact with a second surface of the substance serving as the emitter, and at least the first electrode having a plurality of through regions through which the substance serving as the emitter is exposed, wherein the electron emitter has, in its electrical operation, between the first electrode and the second electrode, a capacitor due to the substance serving as the emitter, and a cluster of capacitors formed the first electrode and the substance serving as the emitter by the through regions of the first electrode.

Gaps are formed between the surface which faces the substance serving as the emitter in the peripheral portions of the through regions and the substance serving as the emitter, and the cluster of capacitors is formed by these gaps. The capacitance of the cluster of capacitors due to the gaps is relatively small. Because of the voltage division between the cluster of capacitors and the capacitor due to the substance serving as the emitter, almost the entire applied voltage is applied across the gaps, which are effective to produce a larger output of the electron emission. Since the cluster of capacitors is connected in series to the capacitor due to the substance serving as the emitter, the overall capacitance is smaller than the capacitance of the capacitor due to the substance serving as the emitter. This is effective to provide such preferred characteristics that the electron emission is performed for a larger output and the overall power consumption is lower.

An electron emitter having an electron emission region according to the present invention is characterized in that if the electron emitter changes to a state (first state) in which an amount of positive charges and an amount of negative charges due to the accumulation of electrons caused by applying a negative voltage are in equilibrium with each other, and changes to a state (second state) in which an amount of negative charges is greater than an amount of positive charges due to the accumulation of further electrons, and if the electron emitter changes from the second state to a state (third state) in which an amount of positive charges and an amount of negative charges due to the emission of electrons caused by applying a positive voltage are in equilibrium with each other, and changes to a state (fourth state) in which an amount of positive charges is greater than an amount of negative charges due to the emission of further electrons, then the electron emission has characteristics represented by:

$$|V1|<|V2|$$

where V1 represents the voltage applied for the electron emitter to change to the first state and V2 the voltage applied for the electron emitter to change to the third state.

In this case, the voltages may be related to each other by $1.5 \times |V1| < |V2|$.

This makes it easy to apply the electron emitter to a display having a plurality of electron emitters arrayed in association with respective pixels for emitting electrons from the electron emitters to display an image.

For example, if the period in which to display one image is defined as one frame, then in a certain period in one frame, all the electron emitters are scanned, and accumulating voltages depending on the luminance levels of corresponding pixels are applied to a plurality of electron emitters which correspond to pixels to be turned on, thereby charges are accumulated in amounts depending on the luminance levels of the corresponding pixels in the electron emitters which correspond to the pixels to be turned on. In a next period, a constant voltage is applied to all the electron emitters to cause the electron emitters which correspond to the pixels to be turned on to emit electrons in amounts depending on the luminance levels of the corresponding pixels, thereby emitting light from the pixels to be turned on.

According to the present invention, if the rate of change of the amount of positive charges and the amount of electrons in the first state is represented by $\Delta Q1/\Delta V1$ and the rate of change of the amount of positive charges and the amount of electrons in the third state by $\Delta Q2/\Delta V2$, then the rates may be related to each other by:

$$(\Delta Q1/\Delta V1) > (\Delta Q2/\Delta V2).$$

If a voltage at which the accumulation of electrons is saturated is represented by V3 and a voltage at which the emission of electrons is started by V4, then the voltages may have characteristics:

$$1 \leq |V4|/|V3| \leq 1.5.$$

Usually, when the electron emitters are arranged in a matrix and selected row by row in synchronism with a horizontal scanning period, and pixel signals depending on the luminance levels of pixels are supplied to the selected electron emitters, the pixel signals are also supplied to unselected pixels.

If the unselected electron emitters are affected by the pixel signals and emit electrons, then problems arise in that the quality of displayed images is degraded and the contrast thereof is lowered.

According to the present invention, on account of the characteristics described above, even if such a simple voltage relationship is employed that the voltage levels of the pixel signals supplied to the selected electron emitters are set to desired voltages in the range from the reference voltage to the voltage V3 and signals that are of opposite polarity to the pixel signals, for example, are supplied to unselected electron emitters, the unselected pixels are not affected by the pixel signals supplied to the selected pixels, and a memory effect is achieved at each pixel for higher luminance and higher contrast.

An electron emitter according to the present invention is characterized by a substance serving as an emitter made of a dielectric material, and a first electrode and a second electrode to which a drive voltage is applied to emit electrons, wherein if a voltage applied in one direction between the first electrode and the second electrode to change the electron emitter from a state in which the substance serving as the emitter is polarized in one direction to a state in which the polarization is inverted is referred to as a first coercive voltage v1, and a voltage applied in another direction to change the polarization back in the one direction from the last-mentioned state is referred to as a second coercive voltage v2, then the voltages are related to each other by:

$v1<0$ or $v2<0$, and $|v1|<|v2|$.

In this case, the voltages may have characteristics:

$1.5 \times |v1| < |v2|$.

If the rate of change of the polarization when the first coercive voltage is applied is represented by $\Delta q1/\Delta v1$, and the rate of change of the polarization when the second coercive voltage is applied by $\Delta q2/\Delta v2$, then the rates may be related to each other by:

$(\Delta q1/\Delta v1) > (\Delta q2/\Delta v2)$.

If a voltage at which the accumulation of electrons is saturated is represented by v3 and a voltage at which the emission of electrons is started by v4, then the voltages may have characteristics:

$1 \leq |v4|/|v3| \leq 1.5$.

According to the present invention, therefore, it is easy to apply the electron emitter to a display having a plurality of electron emitters arrayed in association with respective pixels for emitting electrons from the electron emitters to display an image.

Furthermore, unselected pixels are not affected by signals supplied to selected pixels, and a memory effect is achieved at each pixel for higher luminance and higher contrast.

As described above, the electron emitter according to the present invention is capable of easily developing a high electric field concentration, provides many electron emission regions, has a larger output and higher efficiency of the electron emission, and can be driven at a lower voltage (lower power consumption).

Moreover, the electron emitter according to the present invention is easily applicable to a display having a plurality of electron emitters arrayed in association with respective pixels for emitting electrons from the electron emitters to display an image.

The above and other objects, features, and advantages will become apparent from the following description of the preferred embodiments when taken in conjunction with the accompanying drawings.

BRIEF DESCRIPTION OF THE DRAWINGS

FIG. 16 is a diagram showing the voltage vs. charge quantity characteristics (voltage vs. polarized quantity characteristics) of the electron emitter according to the first embodiment;

FIG. 32 is a diagram showing the relationship of applied voltages according to the drive method shown in FIG. 31;

FIG. 38 is a fragmentary cross-sectional view of a first modification of the electron emitter according to the third embodiment; and FIG. 39 is a fragmentary cross-sectional view of a conventional electron emitter.

DESCRIPTION OF THE PREFERRED EMBODIMENTS

Electron emitters according to embodiments of the present invention will be described below with reference to FIGS. 1 through 38.

Electron emitters according to the present invention can be used in electron beam irradiation apparatus, light sources, LED alternatives, electronic parts manufacturing apparatus, and electronic circuit components, as well as display applications.

An electron beam in an electron beam irradiation apparatus has a higher energy and a better absorption capability than ultraviolet rays in ultraviolet ray irradiation apparatus that are presently in widespread use. The electron emitters may be used to solidify insulating films in superposing wafers for semiconductor devices, harden printing inks without irregularities for drying prints, and sterilize medical devices while being kept in packages.

The electron emitters may also be used as high-luminance, high-efficiency light sources for use in projectors, for example, which may employ ultrahigh-pressure mercury lamps. If the electron emitters according to the present invention are applied to light sources, then they have such features as a smaller size, a longer service life, a high-speed turn-on capability, and a reduced environmental load due to freedom from mercury.

The electron emitters may also be used as LED alternatives in surface light sources such as indoor illumination units, automobile lamps, traffic signal devices, and also in chip light sources, traffic signal devices, and backlight units for small-size liquid-crystal display devices for cellular phones.

The electron emitters may also be used in electronic parts manufacturing apparatus as electron beam sources for film growing apparatus such as electron beam evaporation apparatus, electron sources for generating a plasma (to activate a gas or the like) in plasma CVD apparatus, and electron sources for decomposing gases. Electron emitters may also be used in vacuum micro devices including ultrahigh-speed devices operable in a tera-Hz range and large-current output devices. Electron emitters may also preferably be used as printer components, i.e., light emission devices for applying light to a photosensitive drum in combination with a phosphor, and electron sources for charging dielectric materials.

The electron emitters may also be used in electronic circuit components including digital devices such as switches, relays, diodes, etc. and analog devices such as operational amplifiers, etc. as they can be designed for outputting large currents and higher amplification factors.

Figure 1:
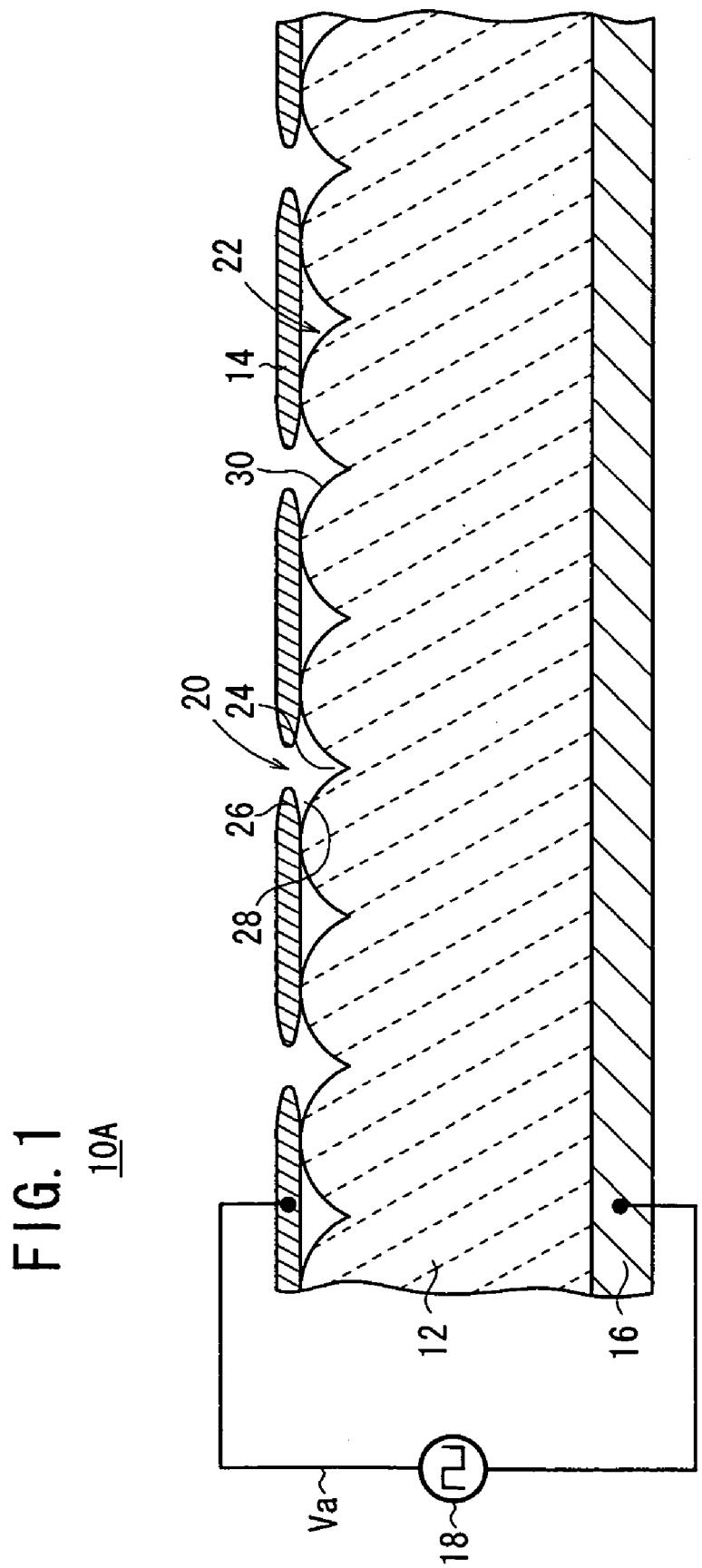
FIG. 1 is a fragmentary cross-sectional view of an electron emitter according to a first embodiment of the present invention.

As shown in FIG. 1, an electron emitter 10A according to a first embodiment comprises a plate-like emitter (a substance serving as an emitter) 12 made of a dielectric material, a first electrode (e.g., an upper electrode) 14 formed on a first surface (e.g., an upper surface) of the emitter 12, a second electrode (e.g., a lower electrode) 16 formed on a second surface (e.g., a lower surface) of the emitter 12, and a pulse generation source 18 for applying a drive voltage Va between the upper electrode 14 and the lower electrode 16.

The upper electrode 14 has a plurality of through regions 20 where the emitter 12 is exposed. The emitter 12 has surface irregularities 22 due to the grain boundary of the dielectric material. The through regions 20 of the upper electrode 14 are formed in areas corresponding to concavities 24 due to the grain boundary of the dielectric material. In the embodiment shown in FIG. 1, one through region 20 is formed in association with one recess 24. However, one through region 20 may be formed in association with a plurality of concavities 24. The particle diameter of the dielectric material of the emitter 12 should preferably be in the range from 0.1 μm to 10 μm, and more preferably be in the range from 2 μm to 7 μm. In the embodiment shown in FIG. 1, the particle diameter of the dielectric material is approximately 3 μm.

Figure 2:
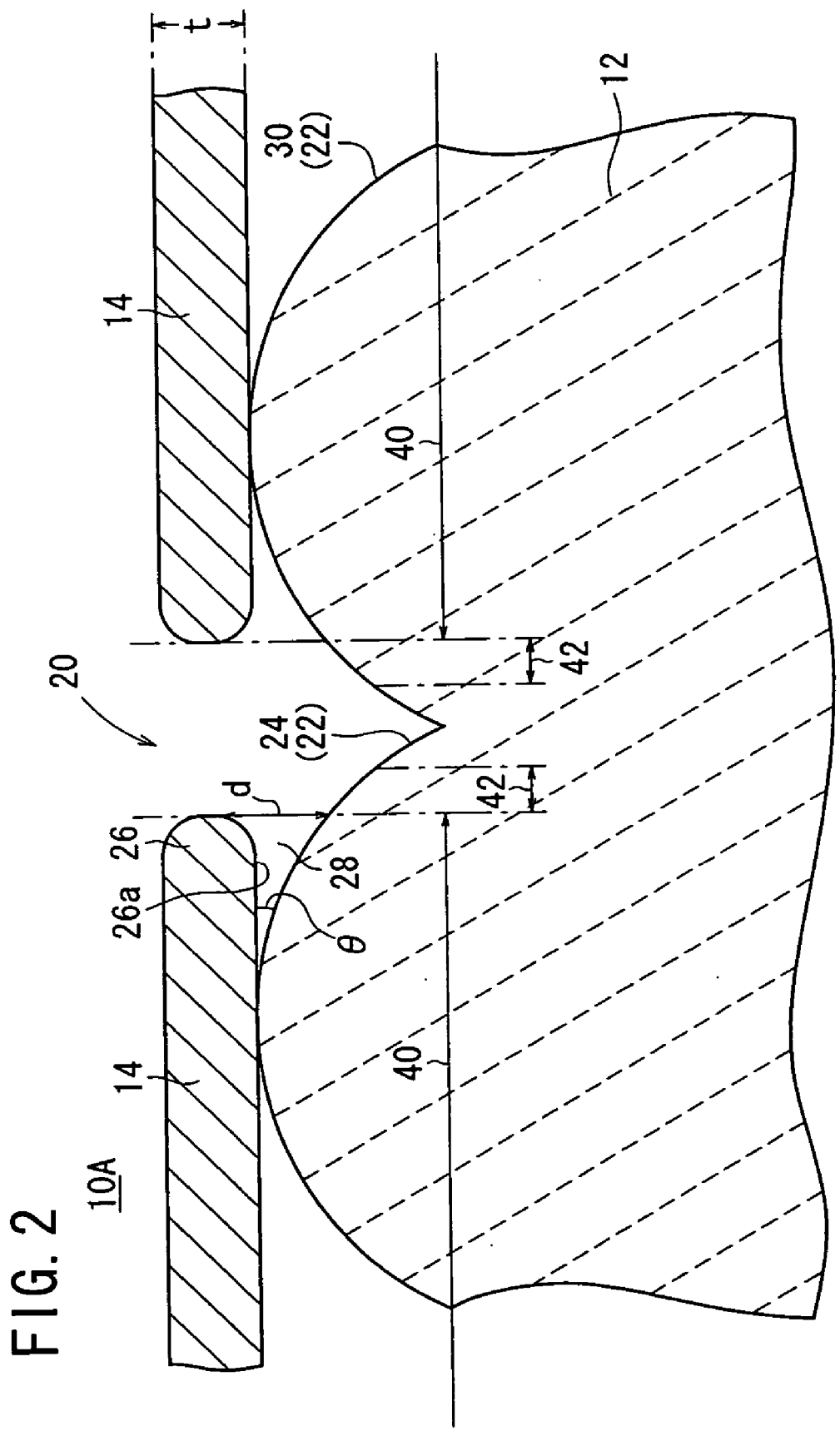
FIG. 2 is an enlarged fragmentary cross-sectional view of the electron emitter shown in FIG. 1.

In this embodiment, as shown in FIG. 2, each of the through regions 20 of the upper electrode 12 has a peripheral portion 26 having a surface 26a facing the emitter 12, the surface 26a being spaced from the emitter 12. Specifically, a gap 28 is formed between the surface 26a, facing the emitter 12, of the peripheral portion 26 of the through region 20 and the emitter 12, and the peripheral portion 26 of the through region 20 of the upper electrode 14 is formed as an overhanging portion (flange). In the description which follows, "the peripheral portion 26 of the through region 20 of the upper electrode 14" is referred to as "the overhanging portion 26 of the upper electrode 14". In FIGS. 1, 2, 5, 7, 8 through 10, and 15, convexities 30 of the surface irregularities 22 of the grain boundary of the dielectric material are shown as having a semicircular cross-sectional shape. However, the convexities 30 are not limited to the semicircular cross-sectional shape.

In the first embodiment, the upper electrode 14 has a thickness t in the range of 0.01 μm≦t≦10 m, and the maximum angle θ between the upper surface of the emitter 12, i.e., the surface of the convexity 30 (which is also the inner wall surface of the concavity 24) of the grain boundary of the dielectric material, and the lower surface 26a of the overhanging portion 26 of the upper electrode 14 is in the range of $1° \leq \theta \leq 60°$. The maximum distance d in the vertical direction between the surface of the convexity 30 (the inner wall surface of the concavity 24) of the grain boundary of the dielectric material and the lower surface 26a of the overhanging portion 26 of the upper electrode 14 is in the range of $0 \mu m < d \leq 10 \mu m$.

Figure 3:
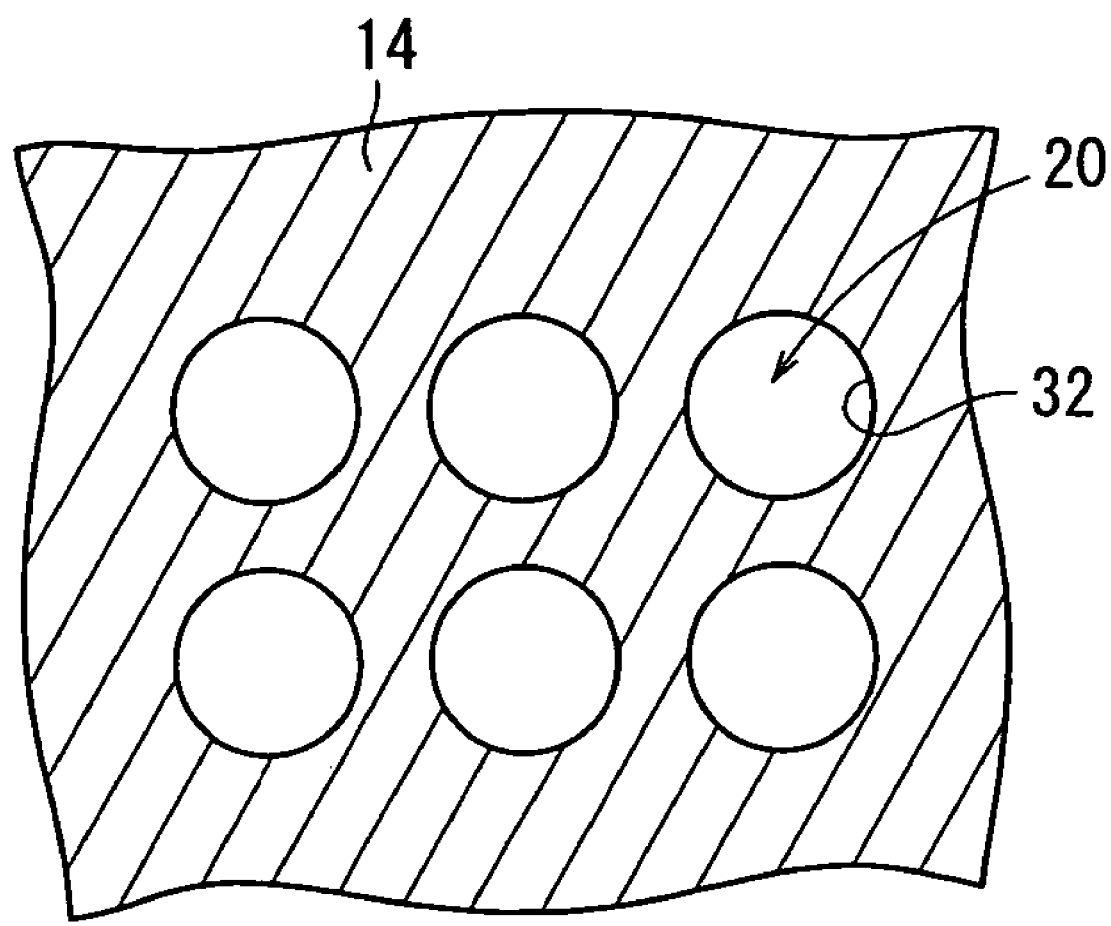
FIG. 3 is a plan view showing an example of the shape of through regions defined in an upper electrode.

In the first embodiment, the shape of the through region 20, particularly the shape as seen from above, as shown in FIG. 3, is the shape of a hole 32, which may be a circular shape, an elliptical shape, a track shape, a shape including a curve, or a polygonal shape such as a quadrangular shape or a triangular shape. In FIG. 3, the shape of the hole 32 is a circular shape.

The hole 32 has an average diameter ranging from 0.1 μm to 10 μm. The average diameter represents the average of the lengths of a plurality of different line segments passing through the center of the hole 32.

Materials of the various components will be described below. The dielectric material which the emitter 12 is made of may be a dielectric material having a relatively large dielectric constant, e.g., a dielectric constant of 1000 or larger. Dielectric materials of such a nature may be ceramics including barium titanate, lead zirconate, lead magnesium niobate, lead nickel niobate, lead zinc niobate, lead manganese niobate, lead magnesium tantalate, lead antimony tinate, lead titanate, lead magnesium tungstenate, lead cobalt niobate, etc. or a combination of any of these materials, a material which chiefly contains 50 weight % or more of any of these materials, or such ceramics to which there is added an oxide such as lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger specific dielectric constant at room temperature if the molar ratio of PMN is increased.

Particularly, a dielectric material where n=0.85 to 1.0 and m=1.0−n is preferable because its specific dielectric constant is 3000 or larger. For example, a dielectric material where n=0.91 and m=0.09 has a specific dielectric constant of 15000 at room temperature, and a dielectric material where n=0.95 and m=0.05 has a specific dielectric constant of 20000 at room temperature.

For increasing the specific dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ=0.375:0.375:0.25 has a specific dielectric constant of 5500, and a dielectric material where PMN:PT:PZ=0.5:0.375:0.125 has a specific dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

The emitter 12 may be in the form of a piezoelectric/electrostrictive layer or an anti-ferrodielectric layer. If the emitter 12 comprises a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony tinate, lead titanate, barium titanate, lead magnesium tungstenate, lead cobalt niobate, or the like. or a combination of any of these materials.

The emitter 12 may be made of chief components including 50 wt % or more of any of the above compounds. Of the above ceramics, the ceramics including lead zirconate is mostly frequently used as a constituent of the piezoelectric/electrostrictive layer of the emitter 12.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics. Alternatively, ceramics produced by adding $SiO_2$, $CeO_2$, $Pb_5Ge_3O_{11}$, or a combination of any of these compounds to the above ceramics may be used. Specifically, a material produced by adding 0.2 wt % of $SiO_2$, 0.1 wt % of $CeO_2$, or 1 to 2 wt % of $Pb_5Ge_3O_{11}$ to a PT-PZ-PMN piezoelectric material is preferable.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 12% or less.

If the emitter 12 is in the form of an anti-ferrodielectric layer, then the anti-ferrodielectric layer may be made of lead zirconate as a chief component, lead zirconate and lead tin as chief components, lead zirconate with lanthanum oxide added thereto, or lead zirconate and lead tin as components with lead zirconate and lead niobate added thereto.

The anti-ferrodielectric layer may be porous. If the anti-ferrodielectric layer is porous, then it should preferably have a porosity of 30% or less.

If the emitter 12 is made of strontium tantalate bismuthate ($SrBi_2Ta_2O_9$), then its polarization inversion fatigue is small. Materials whose polarization inversion fatigue is small are laminar ferrodielectric compounds and expressed by the general formula of $(BiO_2)^{2+}(A_{m-1}B_mO_{3m+1})^{2-}$. Ions of the metal A are $Ca^{2+}$, $Sr^{2+}$, $Ba^{2+}$, $Pb^{2+}$, $Bi^{3+}$, $La^{3+}$, etc., and ions of the metal B are $Ti^{4+}$, $Ta^{5+}$, $Nb^{5+}$, etc.

The baking temperature can be lowered by adding glass such as lead borosilicate glass or the like or other compounds of low melting point (e.g., bismuth oxide or the like) to the piezoelectric/electrostrictive/anti-ferrodielectric ceramics.

If the emitter 12 is made of piezoelectric/electrostrictive/anti-ferrodielectric ceramics, then it may be a sheet-like molded body, a sheet-like laminated body, or either one of such bodies stacked or bonded to another support substrate.

If the emitter 12 is made of a non-lead-based material, then it may be a material having a high melting point or a high evaporation temperature so as to be less liable to be damaged by the impingement of electrons or ions.

The upper electrode 14 is made of an organic metal paste which can produce a thin film after being baked. For example, a platinum resinate paste or the like, should preferably be used. An oxide electrode for suppressing a polarization inversion fatigue, which is made of ruthenium oxide ($RuO_2$), iridium oxide ($IrO_2$), strontium ruthenate ($SrRuO_3$), $La_{1-x}Sr_xCoO_3$ (e.g., x=0.3 or 0.5), $La_{1-x}Ca_xMnO_3$, (e.g., x=0.2), $La_{1-x}Ca_xMn_{1-y}Co_yO_3$ (e.g., x=0.2, y=0.05), or a mixture of any one of these compounds and a platinum resinate paste, for example, is preferable.

The upper electrode 14 may be made of any of the above materials by any of thick-film forming processes including screen printing, spray coating, coating, dipping, electrophoresis, etc., or any of various thin-film forming processes including sputtering, an ion beam process, vacuum evaporation, ion plating, chemical vapor deposition (CVD), plating, etc. Preferably, the upper electrode 14 is made by any of the above thick-film forming processes.

The lower electrode 16 is made of platinum, molybdenum, tungsten, or the like. Alternatively, the lower electrode 16 is made of an electric conductor which is resistant to a high-temperature oxidizing atmosphere, e.g., a metal, an alloy, a mixture of insulative ceramics and a metal, a mixture of insulative ceramics and an alloy, or the like. Preferably, the lower electrode 16 should be made of a precious metal having a high melting point such as platinum, iridium, palladium, rhodium, molybdenum, or the like, or a material chiefly composed of an alloy of silver and palladium, silver and platinum, platinum and palladium, or the like, or a cermet of platinum and ceramics. Further preferably, the lower electrode 16 should be made of platinum only or a material chiefly composed of a platinum-base alloy.

The lower electrode 16 may be made of carbon or a graphite-base material. Ceramics to be added to the electrode material should preferably have a proportion ranging from 5 to 30 volume %. The lower electrode 16 may be made of the same material as the upper electrode, as described above.

The lower electrode 16 should preferably be formed by any of various thick-film forming processes. The lower electrode 16 has a thickness of 20 μm or less or preferably a thickness of 5 μm or less.

Each time the emitter 12, the upper electrode 14, or the lower electrode 16 is formed, the assembly is heated (sintered) into an integral structure.

The sintering process for integrally combining the emitter 12, the upper electrode 14, and the lower electrode 16 may be carried out at a temperature ranging from 500 to 1400° C., preferably from 1000 to 1400° C. For heating the emitter 12 which is in the form of a film, the emitter 12 should be sintered together with its evaporation source while their atmosphere is being controlled, so that the composition of the emitter 12 will not become unstable at high temperatures.

By performing the sintering process, the film which will serve as the upper electrode 14 is shrunk from the thickness of 10 μm to the thickness of 0.1 μm, and simultaneously a plurality of holes are formed therein. As a result, as shown in FIG. 1, a plurality of through regions 20 are formed in the upper electrode 14, and the peripheral portions 26 of the through regions 20 are turned into overhanging portions. In advance (of the sintering process), the film which will serve as the upper electrode 14 may be patterned by etching (wet etching or dry etching) or lift-off, and then may be sintered. In this case, recesses or slits may easily be formed as the through regions 20.

The emitter 12 may be covered with a suitable member, and then sintered such that the surface of the emitter 12 will not be exposed directly to the sintering atmosphere.

The principles of electron emission of the electron emitter 10A will be described below. First, a drive voltage Va is applied between the upper electrode 14 and the lower electrode 16. The drive voltage Va is defined as a voltage, such as a pulse voltage or an alternating-current voltage, which abruptly changes, with time, from a voltage level higher or lower than a reference voltage (e.g., 0 V) to a voltage level that is lower or higher than the reference voltage.

A triple junction is formed in a region of contact between the upper surface of the emitter 12, the upper electrode 14, and a medium (e.g., a vacuum) around the electron emitter 10A. The triple junction is defined as an electric field concentration region formed by a contact between the upper electrode 14, the emitter 12, and the vacuum. The triple junction includes a triple point where the upper electrode 14, the emitter 12, and the vacuum exist as one point. The vacuum level in the atmosphere should preferably in the range from $10^2$ to $10^{-6}$ Pa and more preferably in the range from $10^{-3}$ to $10^{-5}$ Pa.

In the first embodiment, the triple junction is formed on the overhanging portion 26 of the upper electrode 14 and the peripheral area of the upper electrode 14. Therefore, when the drive voltage Va is applied between the upper electrode 14 and the lower electrode 16, an electric field concentration occurs at the triple junction.

Figure 4:
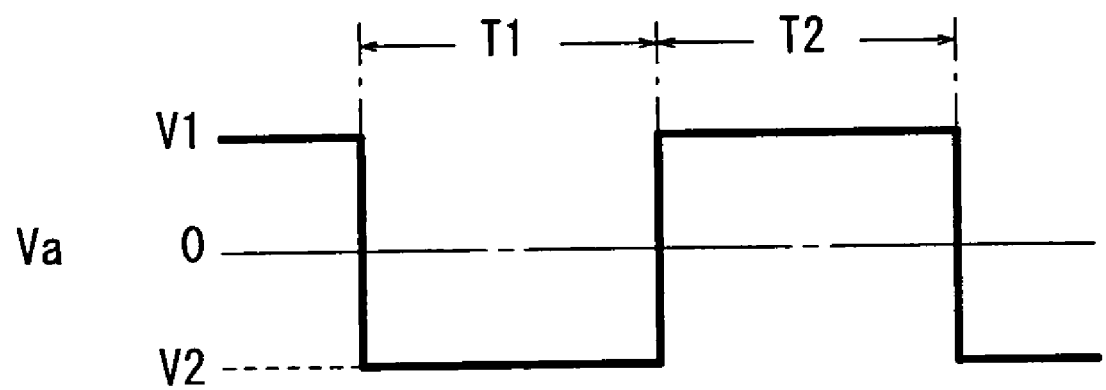
FIG. 4 is a diagram showing the voltage waveform of a drive voltage according to a first electron emission process.
Figure 5:
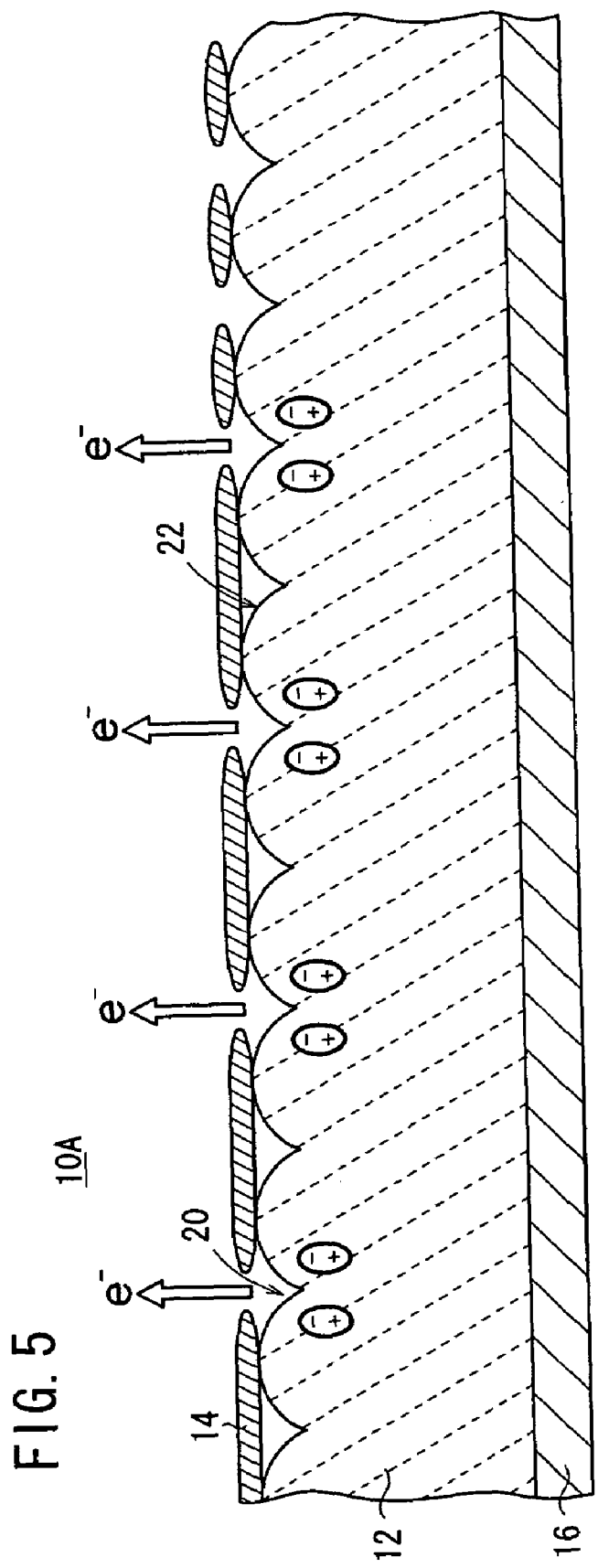
FIG. 5 is a view illustrative of the emission of electrons in a second output period of the first electron emission process.
Figure 6:
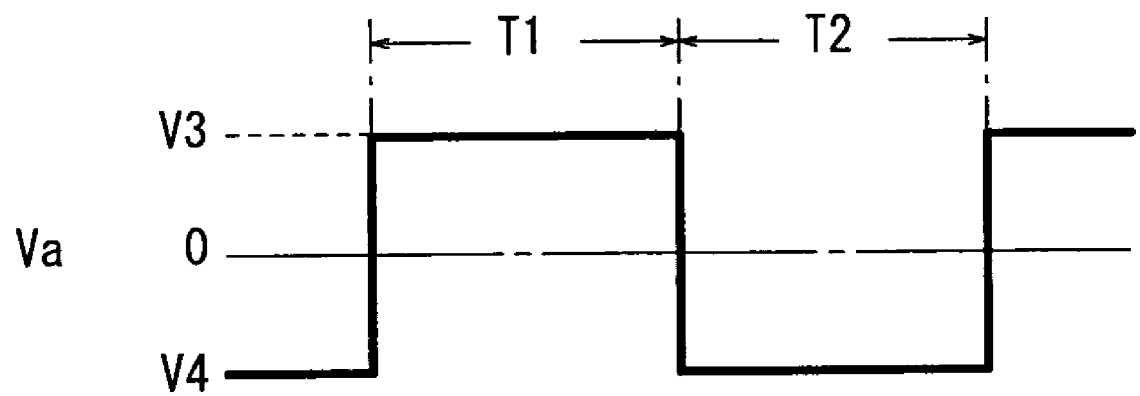
FIG. 6 is a diagram showing the voltage waveform of a drive voltage according to a second electron emission process.

A first electron emission process will first be described below with reference to FIGS. 4 and 5. In a first output period T1 shown in FIG. 4, a voltage V2 lower than a reference voltage (e.g., 0 V) is applied to the upper electrode 14, and a voltage V1 higher than the reference voltage is applied to the lower electrode 16. In the first output period T1, an electric field concentration occurs at the triple junction, accumulating electrons in the portions of the emitter 12 which are exposed through the through regions 20 of the upper electrode 14 and regions near the peripheral portion of the upper electrode 14. At this time, the upper electrode 14 functions as an electron supply source.

In a next second output period T2, the voltage level of a drive voltage Va is quickly changed, i.e., the voltage V1 higher than the reference voltage is applied to the upper electrode 14, and the voltage V2 lower than the reference voltage is applied to the lower electrode 16. Now, a reverse electric field concentration occurs at the triple junction referred to above, causing the portions of the emitter 12 where electrons have been accumulated to emit electrons through the through regions 20. Electrons are also emitted from the portions of the emitter 12 near the outer peripheral portion of the upper electrode 14.

Figure 7:
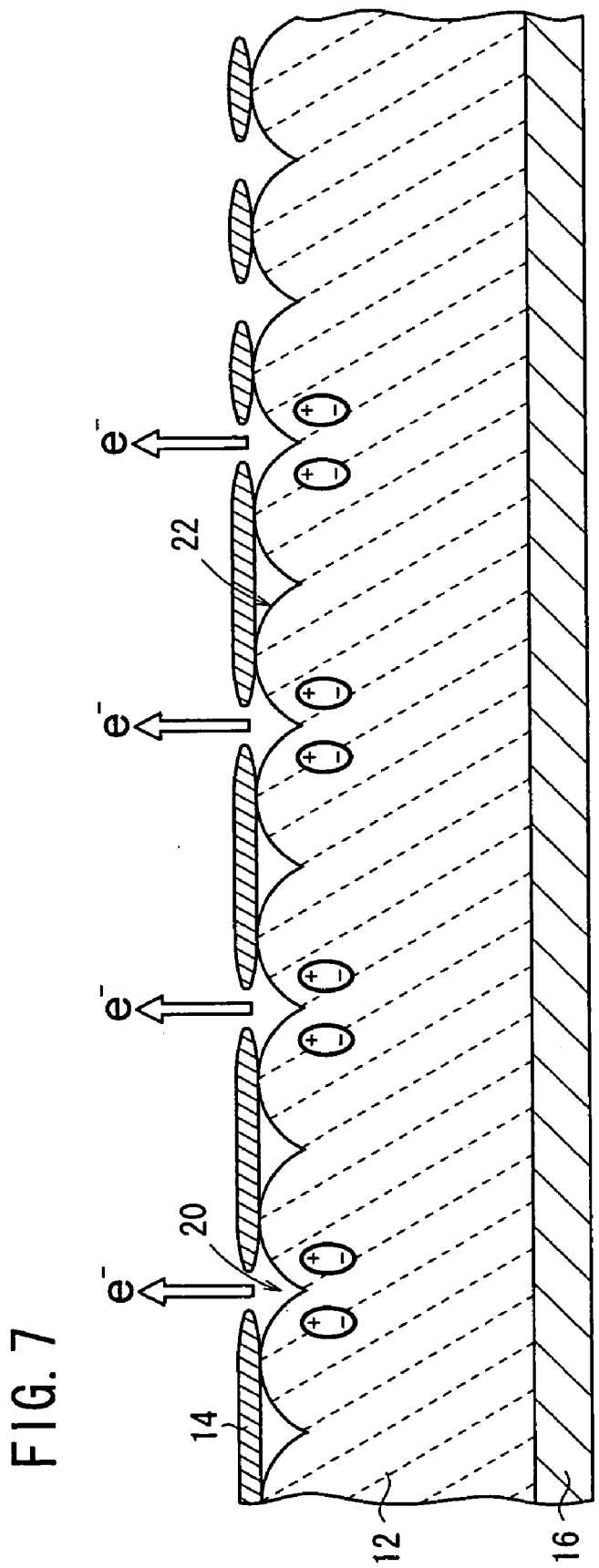
FIG. 7 is a view showing the emission of electrons a second output period of the second electron emission process.

A second electron emission process will be described below. In a first output period T1 shown in FIG. 6, a voltage V3 higher than a reference voltage is applied to the upper electrode 14, and a voltage V4 lower than the reference voltage is applied to the lower electrode 16. In the first output period T1, the electron emitter is prepared for electron emission (e.g., the emitter 12 is polarized in one direction). In a next second output period T2, the voltage level of a drive voltage Va is quickly changed, i.e., the voltage V4 lower than the reference voltage is applied to the upper electrode 14, and the voltage V3 higher than the reference voltage is applied to the lower electrode 16. Now, an electric field concentration occurs at the triple junction referred to above, causing the upper electrode 14 to emit primary electrons, which impinge upon the portions of the emitter 12 which are exposed through the through region 20 and the regions near the outer peripheral portion of the upper electrode 14. As shown in FIG. 7, secondary electrons (including reflected primary electrons) are emitted from the portions hit by the primary electrons. Thus, secondary electrons are emitted from the through region 20 and the regions near the outer peripheral portion of the upper electrode 14 in an initial stage of the second output period T2.

According to the first embodiment, since the upper electrode 14 has the plural through regions 20, electrons are uniformly emitted from each of the through regions 20 and the outer peripheral portions of the upper electrode 14. Thus, any variations in the overall electron emission characteristics of the electron emitter 12 are reduced, making it possible to facilitate the control of the electron emission and increase the electron emission efficiency.

According to the first embodiment, furthermore, because the gap 28 is formed between the overhanging portion 26 of the upper electrode 14 and the emitter 12, when the drive voltage Va is applied, an electric field concentration tends to be produced in the region of the gap 28. This leads to a higher efficiency of the electron emission, making the drive voltage lower (emitting electrons at a lower voltage level)

As described above, since the upper electrode 14 has the overhanging portion 26 on the peripheral portion of the through region 20, together with the increased electric field concentration in the region of the gap 28, electrons are easily emitted from the overhanging portion 26 of the upper electrode 14. This leads to a larger output and higher efficiency of the electron emission, making the drive voltage lower. In either one of the first electron emission process (the process of emitting electrons accumulated in the emitter 12) and the second electron emission process (the process of emitting secondary electrons by causing primary electrons from the upper electrode 14 to impinge upon the emitter 12), as the overhanging portion 26 of the upper electrode 14 functions as a gate electrode (a control electrode, a focusing electronic lens, or the like), the straightness of emitted electrons can be increased. This is effective in reducing crosstalk if a number of electron emitters 10A are arrayed for use as an electron source of a display.

As described above, the electron emitter 10A according to the first embodiment is capable of easily developing a high electric field concentration, provides many electron emission regions, has a larger output and higher efficiency of the electron emission, and can be driven at a lower voltage (lower power consumption).

With the first embodiment in particular, at least the upper surface of the emitter 12 has the surface irregularities 22 due to the grain boundary of the dielectric material. As the upper electrode 14 has the through regions 20 in portions corresponding to the concavities 24 of the grain boundary of the dielectric material, the overhanging portions 26 of the upper electrode 14 can easily be realized.

The maximum angle θ between the upper surface of the emitter 12, i.e., the surface of the convexity 30 (which is also the inner wall surface of the concavity 24) of the grain boundary of the dielectric material, and the lower surface 26a of the overhanging portion 26 of the upper electrode 14 is in the range of $1° \leq \theta \leq 60°$. The maximum distance d in the vertical direction between the surface of the convexity 30 (the inner wall surface of the concavity 24) of the grain boundary of the dielectric material and the lower surface 26a of the overhanging portion 26 of the upper electrode 14 is in the range of $0 \mu m < d \leq 10 \mu m$. These arrangements make it possible to increase the degree of the electric field concentration in the region of the gap 28, resulting in a larger output and higher efficiency of the electron emission and making the drive voltage lower efficiently.

According to the first embodiment, the through region 20 is in the shape of the hole 32. As shown in FIG. 2, the portions of the emitter 12 where the polarization is inverted or changed depending on the drive voltage Va applied between the upper electrode 14 and the lower electrode 16 (see FIG. 1) include a portion (first portion) 40 directly below the upper electrode 14 and a portion (second portion) 42 corresponding to a region extending from the inner peripheral edge of the through region 20 inwardly of the through region 20. Particularly, the second portion 42 changes depending on the level of the drive voltage Va and the degree of the electric field concentration. According to the first embodiment, the average diameter of the hole 32 is in the range from 0.1 μm to 10 μm. Insofar as the average diameter of the hole 32 is in this range, the distribution of electrons emitted through the through region 20 is almost free of any variations, allowing electrons to be emitted efficiently.

If the average diameter of the hole 32 is less than 0.1 μm, then the region where electrons are accumulated is made narrower, reducing the amount of emitted electrons. While one solution would be to form many holes 32, it would be difficult and highly costly to form many holes 32. If the average diameter of the hole 32 is in excess of 10 μm, then the proportion (share) of the portion (second portion) 42 which contributes to the emission of electrons in the portion of the emitter 12 that is exposed through the through region 20 is reduced, resulting in a reduction in the electron emission efficiency.

Figure 8:
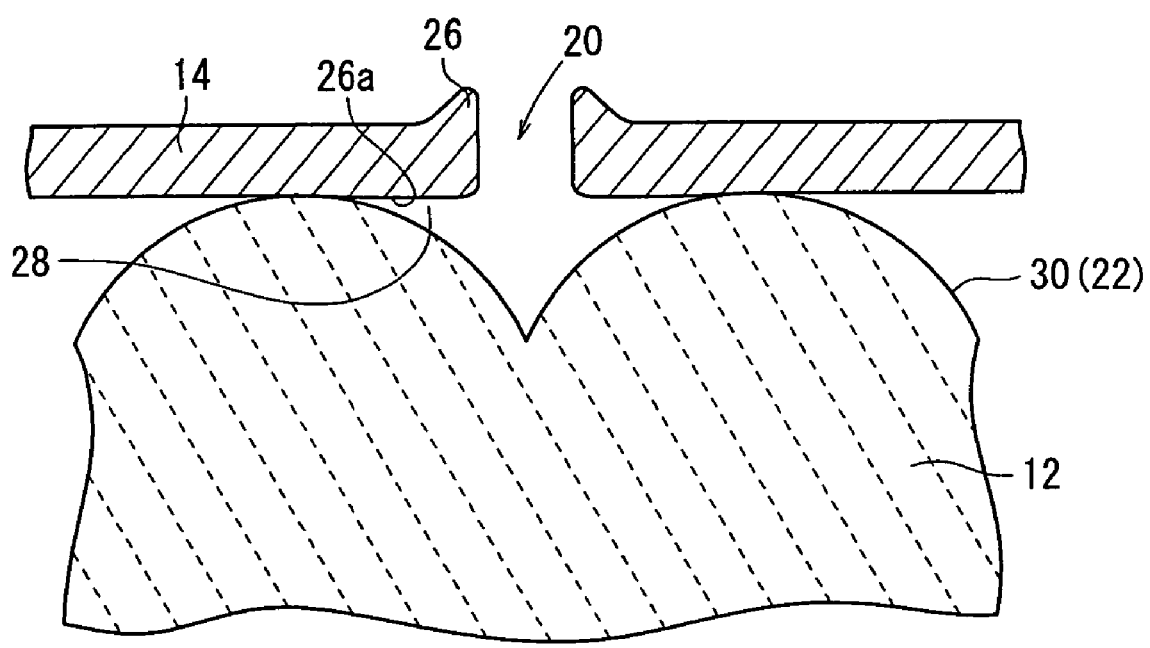
FIG. 8 is a view showing a cross-sectional shape of an overhanging portion of the upper electrode.
Figure 9:
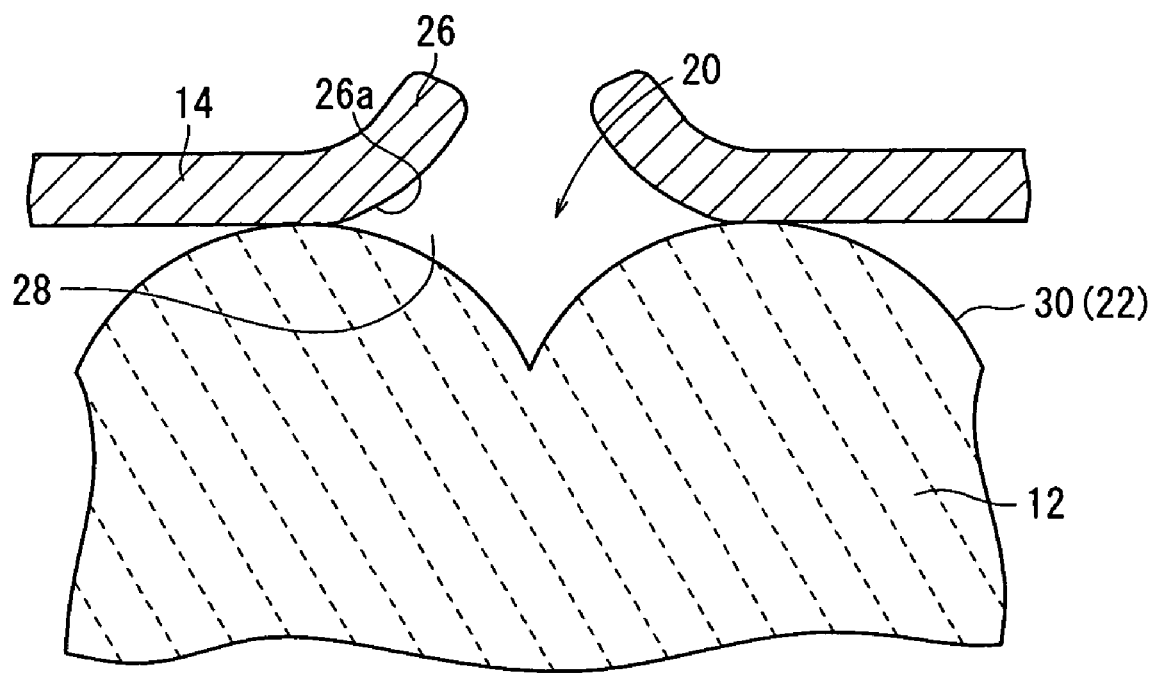
FIG. 9 is a view showing a cross-sectional shape of another overhanging portion of the upper electrode.
Figure 10:
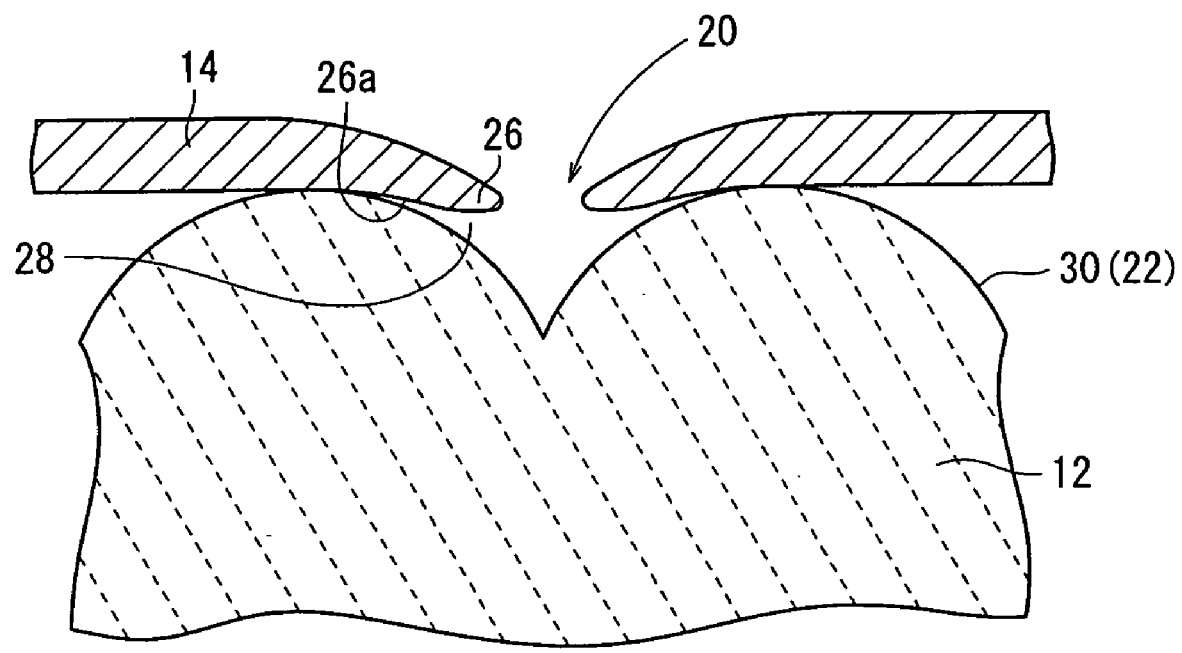
FIG. 10 is a view showing a cross-sectional shape of still another overhanging portion of the upper electrode.

The overhanging portion 26 of the upper electrode 14 may have upper and lower surfaces extending horizontally as shown in FIG. 2. Alternatively, as shown in FIG. 8, the overhanging portion 26 may have a lower surface 26a extending substantially horizontally and an upper end raised upwardly. Alternatively, as shown in FIG. 9, the overhanging portion 26 may have a lower surface 26a inclined progressively upwardly toward the center of the through region 20. Further alternatively, as shown in FIG. 10, the overhanging portion 26 may have a lower surface 26a inclined progressively downwardly toward the center of the through region 20. The arrangement shown in FIG. 8 is capable of increasing the function as a gate electrode. The arrangement shown in FIG. 10 makes it easier to produce a higher electric field concentration for a larger output and higher efficiency of the electron emission because the gap 28 is narrower.

Figure 11:
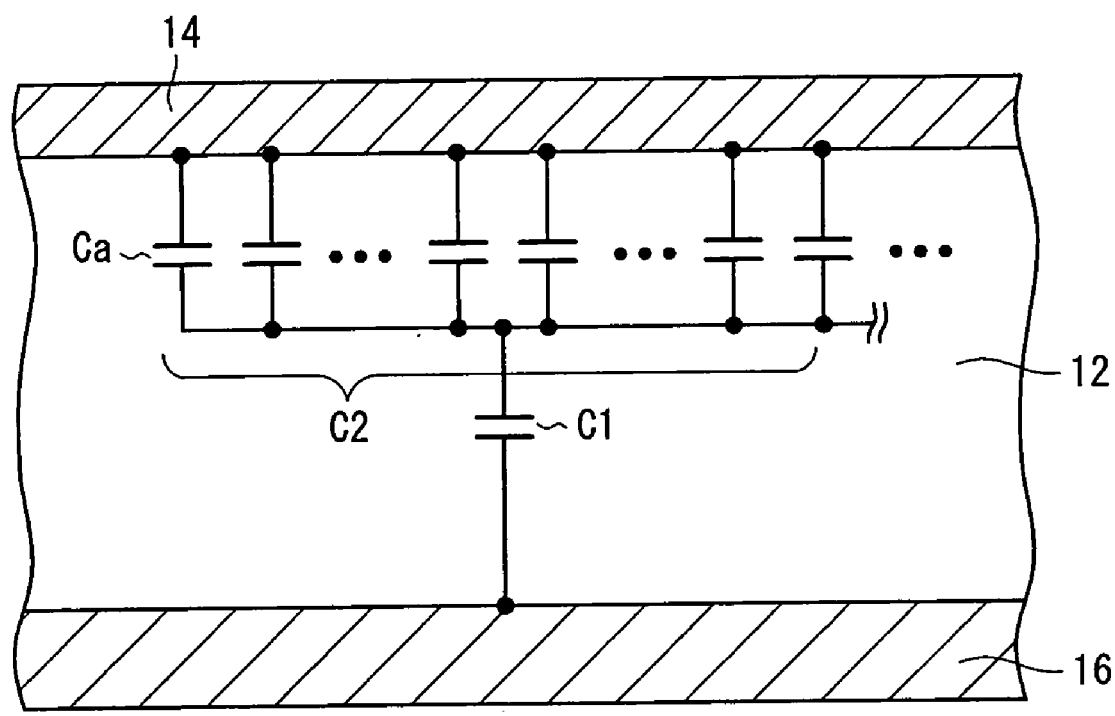
FIG. 11 is an equivalent circuit diagram showing a connected state of various capacitors connected between an upper electrode and a lower electrode.

As shown in FIG. 11, the electron emitter has in its electrical operation a capacitor C1 due to the emitter 12 and a cluster of capacitors Ca due to respective gaps 28, disposed between the upper electrode 14 and the lower electrode 16. The capacitors Ca due to the respective gaps 28 are connected in parallel to each other into a single capacitor C2. In terms of an equivalent circuit, the capacitor C1 due to the emitter 12 is connected in series to the capacitor C2 which comprises the cluster of capacitors Ca.

Actually, the capacitor C1 due to the emitter 12 is not directly connected in series to the capacitor C2 which comprises the cluster of capacitors Ca, but the capacitive component that is connected in series varies depending on the number of the through regions 20 formed in the upper electrode 14 and the overall area of the through regions 20.

Figure 12:
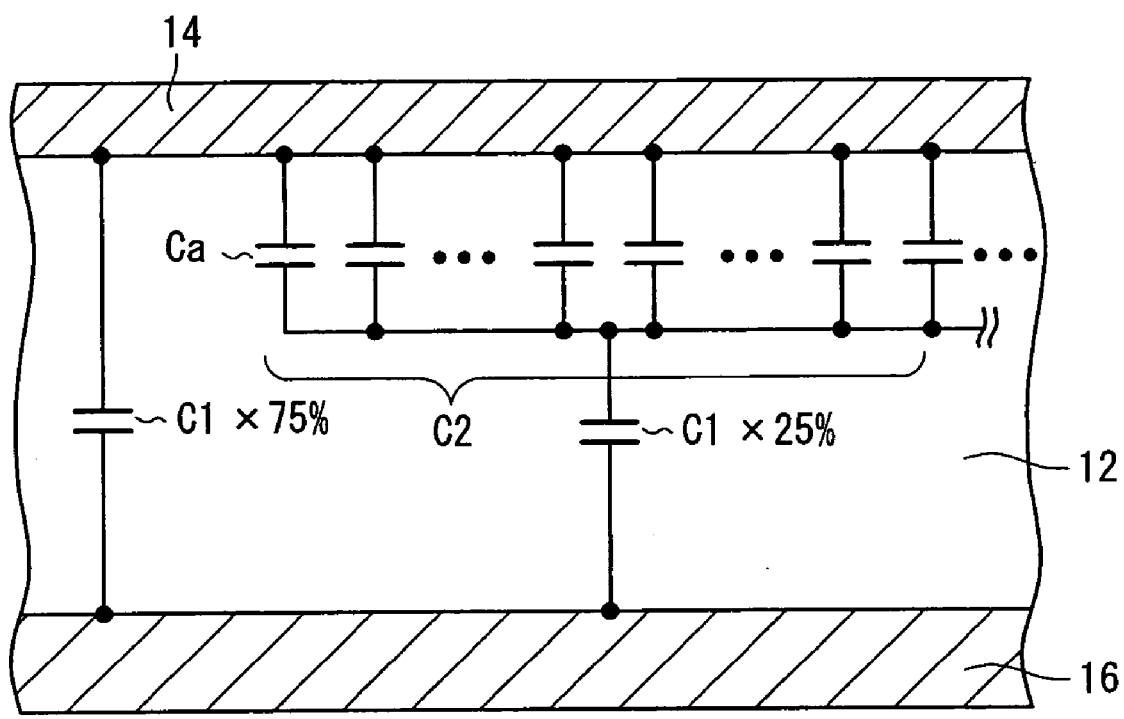
FIG. 12 is a diagram illustrative of calculations of capacitances of the various capacitors connected between the upper electrode and the lower electrode.

Capacitance calculations will be performed on the assumption that 25% of the capacitor C1 due to the emitter 12 is connected in series to the capacitor C2 which comprises the cluster of capacitors Ca, as shown in FIG. 12. Since the gaps 28 are in vacuum, the relative dielectric constant thereof is 1. It is assumed that the maximum distance d of the gaps 28 is 0.1 μm, the area S of each gap 28 is S=1 μm×1 μm, and the number of the gaps 28 is 10,000. It is also assumed that the emitter 12 has a relative dielectric constant of 2000, the emitter 12 has a thickness of 20 μm, and the confronting area of the upper and lower electrodes 14, 16 is 200 μm×200 μm. The capacitor C2 which comprises the cluster of capacitors Ca has a capacitance of 0.885 pF, and the capacitor C1 due to the emitter 12 has a capacitance of 35.4 pF. If the portion of the capacitor C1 due to the emitter 12 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Because the series-connected portion and the remaining portion are connected in parallel to each other, the overall capacitance is 27.5 pF. This capacitance is 78% of the capacitance 35.4 pF of the capacitor C1 due to the emitter 12. Therefore, the overall capacitance is smaller than the capacitance of the capacitor C1 due to the emitter 12.

Consequently, the capacitance of the cluster of capacitors Ca due to the gaps 28 is relatively small. Because of the voltage division between the cluster of capacitors Ca and the capacitor C1 due to the emitter 12, almost the entire applied voltage Va is applied across the gaps 28, which are effective to produce a larger output of the electron emission.

Since the capacitor C2 which comprises the cluster of capacitors Ca is connected in series to the capacitor C1 due to the emitter 12, the overall capacitance is smaller than the capacitance of the capacitor C1 due to the emitter 12. This is effective to provide such preferred characteristics that the electron emission is performed for a larger output and the overall power consumption is lower.

Three modifications of the electron emitter 10A described above will be described below with reference to FIGS. 13 through 15.

Figure 13:
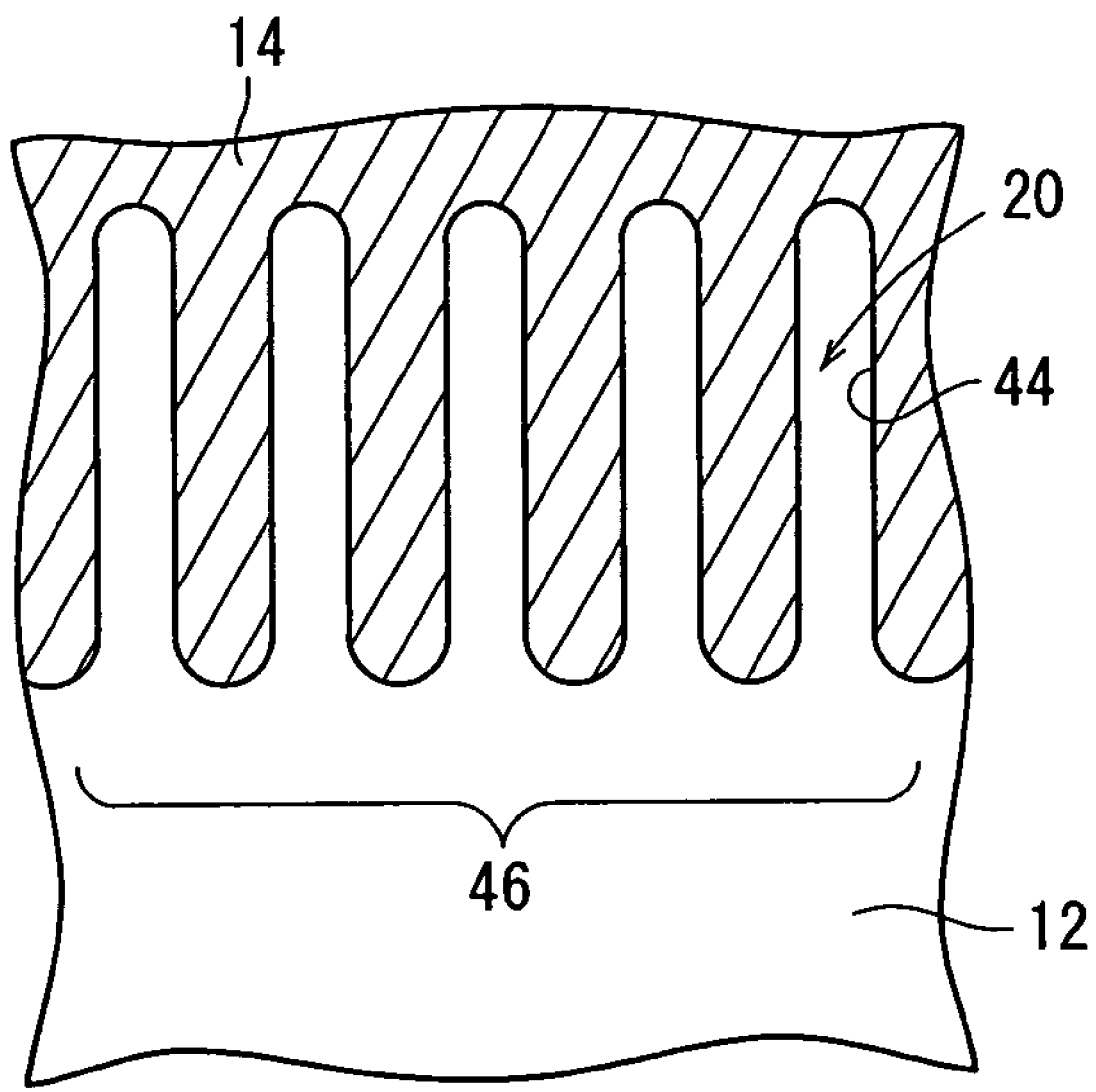
FIG. 13 is a fragmentary plan view of a first modification of the electron emitter according to the first embodiment.

As shown in FIG. 13, an electron emitter 10Aa according to a first modification differs from the above electron emitter 10A in that the through region 20 has a shape, particularly a shape viewed from above, in the form of a recess 44. As shown in FIG. 13, the recess 44 should preferably be shaped such that a number of recesses 44 are successively formed into a comb-toothed recess 46. The comb-toothed recess 46 is effective to reduce variations in the distribution of electrons emitted through the through region 20 for efficient electron emission. Particularly, it is preferable to have the average width of the recesses 44 in the range from 0.1 μm to 10 μm. The average width represents the average of the lengths of a plurality of different line segments extending perpendicularly across the central line of the recess 44.

Figure 14:
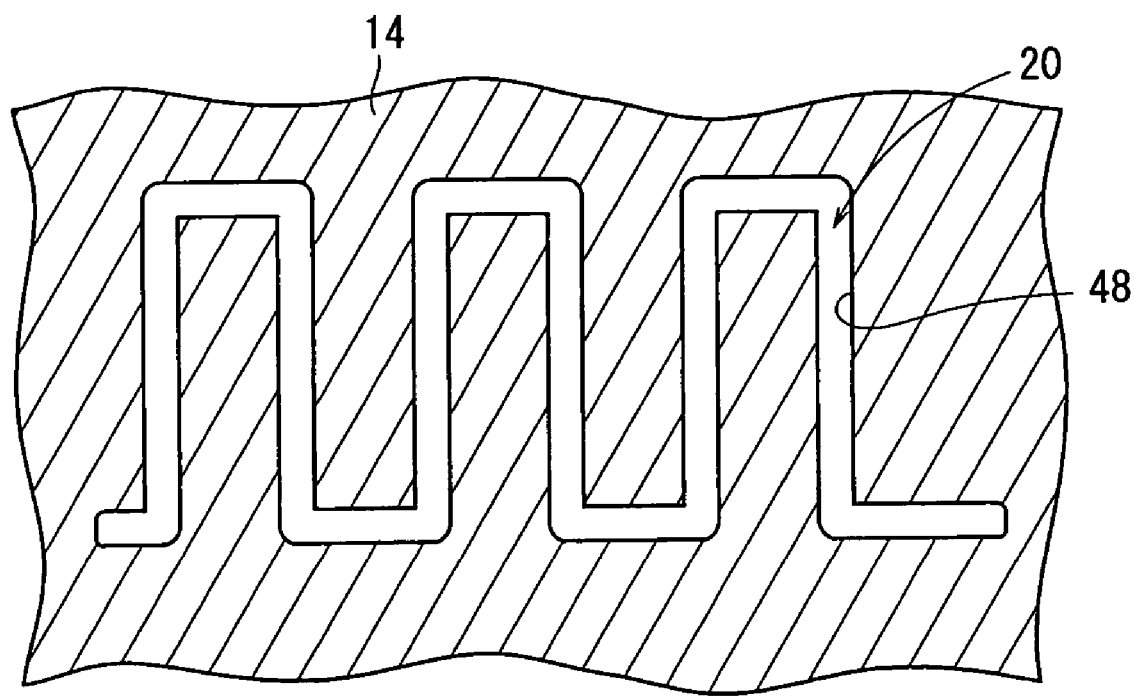
FIG. 14 is a fragmentary plan view of a second modification of the electron emitter according to the first embodiment.

As shown in FIG. 14, an electron emitter 10Ab according to a second modification differs from the above electron emitter 10A in that the through region 20 has a shape, particularly a shape viewed from above, in the form of a slit 48. The slit 48 is defined as something having a major axis (extending in a longitudinal direction) whose length is 10 times or more the length of the minor axis (extending in a transverse direction thereof). Those having a major axis (extending in a longitudinal direction) whose length is less than 10 times the length of the minor axis (extending in a transverse direction thereof) are defined as holes 32 (see FIG. 3). The slit 48 includes a succession of holes 32 in communication with each other. The slit 48 should preferably have an average width ranging from 0.1 μm to 10 μm for reducing variations in the distribution of electrons emitted through the through region 48 for efficient electron emission. The average width represents the average of the lengths of a plurality of different line segments extending perpendicularly across the central line of the slit 48.

Figure 15:
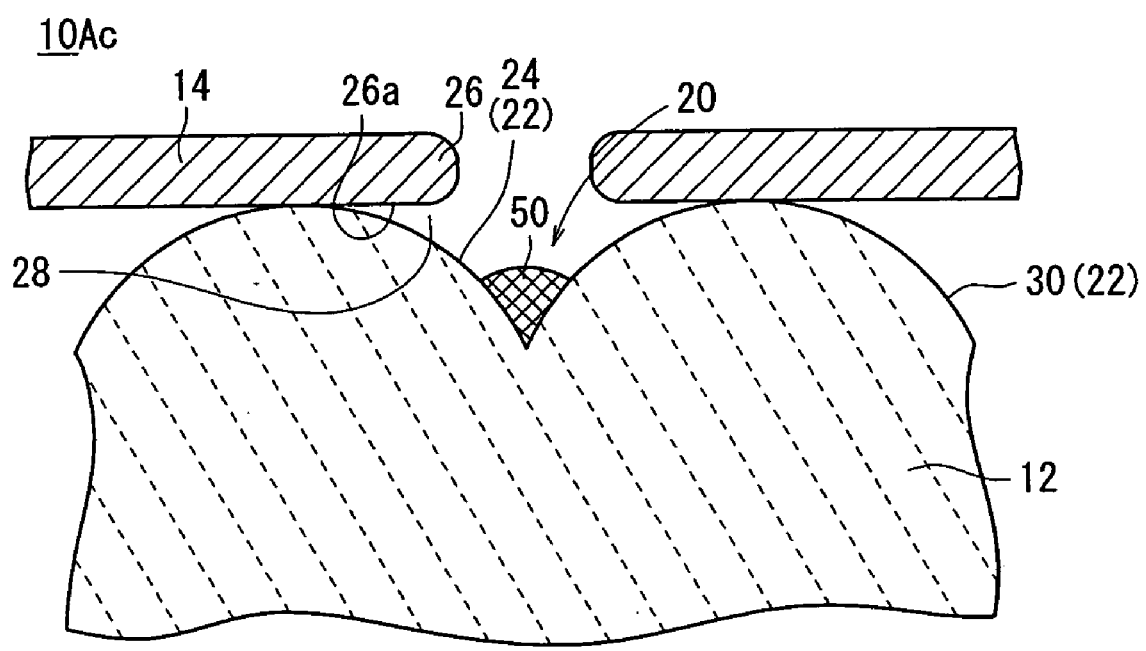
FIG. 15 is a fragmentary plan view of a third modification of the electron emitter according to the first embodiment.

As shown in FIG. 15, an electron emitter 10Ac according to a third modification differs from the above electron emitter 10A in that a floating electrode 50 exists on the portion of the upper surface of the emitter 12 which corresponds to the through region 20, e.g., in the concavity 24 due to the grain boundary of the dielectric material. With this arrangement, since the floating electrode 50 also serves as an electron supply source, a number of electrons can be emitted out through the through region 20 in the second output period T2 (see FIG. 4) according to the first electron emission process described above) in an electron emission stage.

The characteristics of the electron emitter 10A according to the first embodiment, particularly, the voltage vs. charge quantity characteristics (voltage vs. polarized quantity characteristics), will be described below.

The electron emitter 10A according to the first embodiment is characterized by an asymmetric hysteresis curve based on the reference voltage=0 (V) in vacuum, as indicated by the characteristics shown in FIG. 16.

The characteristics will be described below. If a region of the emitter 12 from which electrons are emitted is defined as an electron emission region, then at a point p1 (initial state) where the reference voltage is applied, almost no electrons are stored in the electron emission region. Thereafter, when a negative voltage is applied, the amount of positive charges in the electron emission region increases, storing electrons. When the level of the negative voltage increases in a negative direction, electrons are progressively stored in the electron emission region until the amount of positive charges and the amount of electrons are held in equilibrium with each other at a point p2 of the negative voltage. As the level of the negative voltage further increases in the negative direction, the stored amount of electrons increases, making the amount of negative charges greater than the amount of positive charges. The accumulation of electrons is saturated at a point p3.

As the level of the negative voltage further decreases, and a positive voltage is applied in excess of the reference voltage, electrons start being emitted at a point p4. When the positive voltage increases in a positive direction, the amount of emitted electrons increases until the amount of positive charges and the amount of electrons are held in equilibrium with each other at a point p5. At a point p6, almost all the stored electrons are emitted, bringing the difference between the amount of positive charges and the amount of negative charges into substantial conformity with a value in the initial state.

The characteristics have the following features:

(1) If the negative voltage at the point p2 where the amount of positive charges and the amount of electrons are held in equilibrium with each other is represented by V1 and the positive voltage at the point p5 by V2, then these voltages satisfy the following relationship:

$$|V1|<|V2|$$

(2) More specifically, the relationship is expressed as $$1.5 \times |V1| < |V2|$$

(3) If the rate of change of the amount of positive charges and the amount of electrons at the point p2 is represented by $\Delta Q1/\Delta V1$ and the rate of change of the amount of positive charges and the amount of electrons at the point p5 by $\Delta Q2/\Delta V2$, then these rates satisfy the following relationship:

$$(\Delta Q1/\Delta V1) > (\Delta Q2/\Delta V2)$$

(4) If the voltage at which the accumulation of electrons is saturated is represented by V3 and the voltage at which electrons start being emitted by V4, then these voltages satisfy the following relationship:

$$1 \leq |V4|/|V3| \leq 1.5$$

The characteristics shown in FIG. 16 will be described below in terms of the voltage vs. charge quantity characteristics. It is assumed, in the description which follows, that the emitter 12 is polarized in one direction, with dipoles having negative poles facing toward the upper surface of the emitter 12 (see FIG. 17A).

Figure 17A:
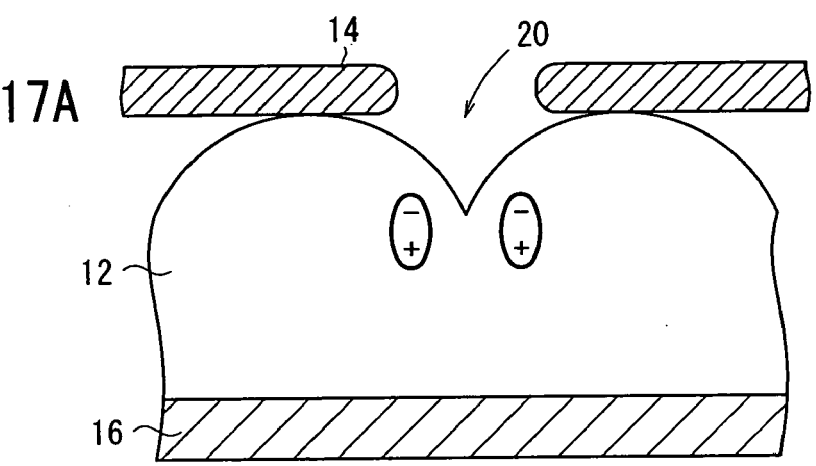
FIG. 17A is a view illustrative of a state at a point p1 shown in FIG. 16.
Figure 17B:
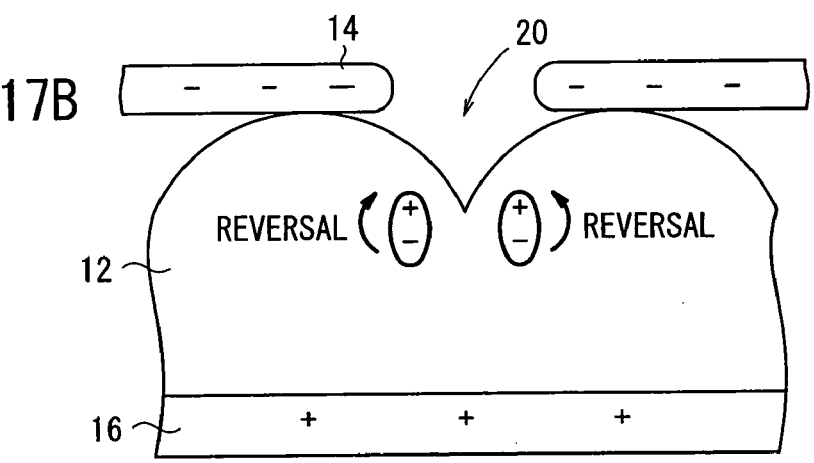
FIG. 17B is a view illustrative of a state at a point p2 shown in FIG. 16.
Figure 17C:
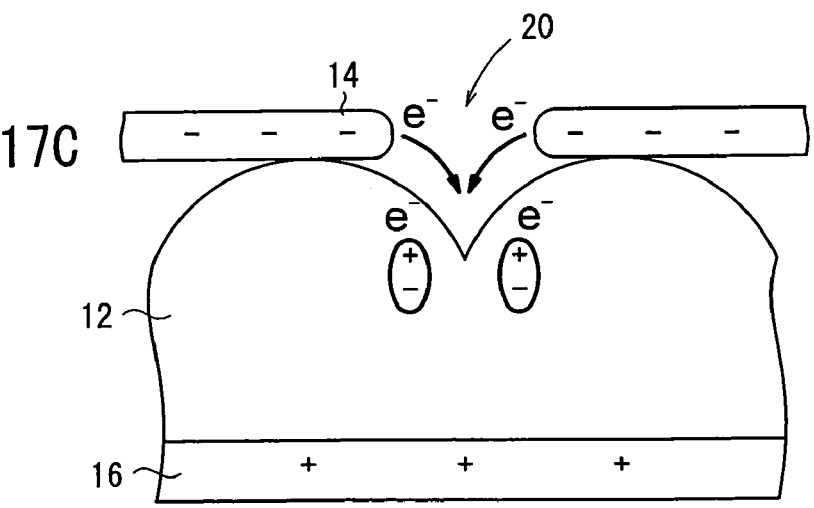
FIG. 17C is a view illustrative of a state from the point p2 to a point p3 shown in FIG. 16.

At the point p1 (initial state) where the reference voltage (e.g., 0 V) is applied as shown in FIG. 16, since the negative poles of the dipole moments face toward the upper surface of the emitter 12, as shown in FIG. 17A, almost no electrons are accumulated on the upper surface of the emitter 12.

Thereafter, when a negative voltage is applied and the level of the negative voltage is increased in the negative direction, the polarization starts being inverted substantially at the time the negative voltage exceeds a negative coercive voltage (see the point p2 in FIG. 16). All the polarization is inverted at the point p3 shown in FIG. 16 (see FIG. 17B). Because of the polarization inversion, an electric field concentration occurs at the triple junction, causing electrons to be accumulated in the portion of the emitter 12 which is exposed through the through region 20 of the upper electrode 14 and the portion of the emitter 12 which is near the peripheral portion of the upper electrode 14 (see FIG. 17C). In particular, electrons are emitted (emitted inwardly) from the upper electrode 14 toward the portion of the emitter 12 which is exposed through the through region 20 of the upper electrode 14. At the point p3 shown in FIG. 16, the accumulation of electrons is saturated.

Figure 18A:
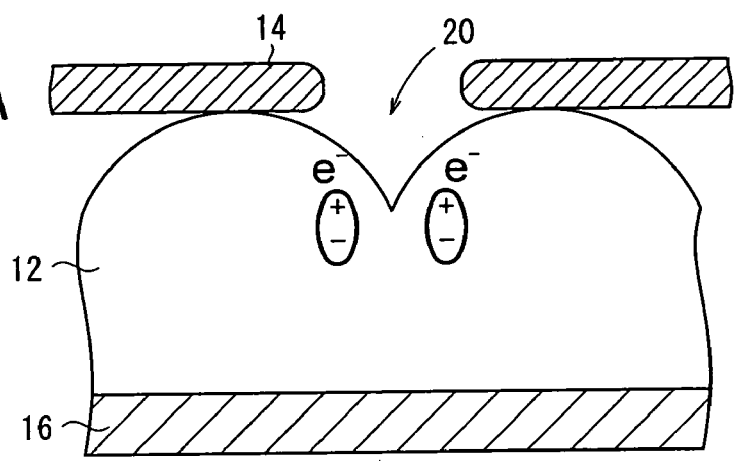
FIG. 18A is a view illustrative of a state from the point p3 to a point p4 shown in FIG. 16.
Figure 18B:
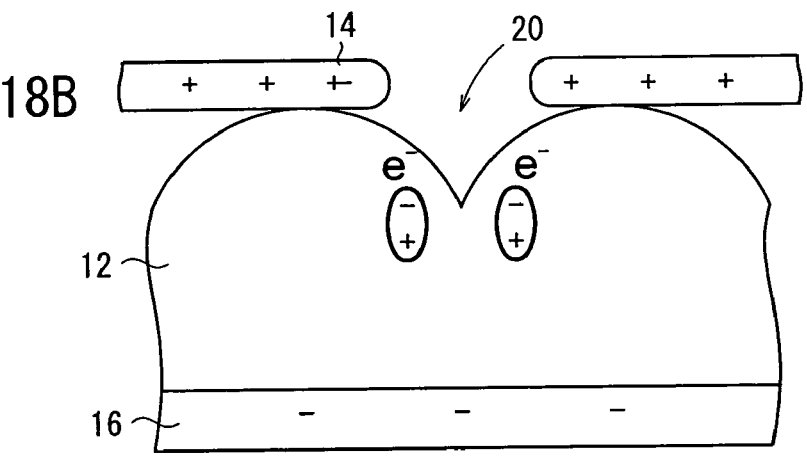
FIG. 18B is a view illustrative of a state immediately prior to a point p4 shown in FIG. 16.

Thereafter, when the level of the negative voltage is reduced and a positive voltage is applied in excess of the reference voltage, the upper surface of the emitter 12 is kept charged up to a certain voltage level (see FIG. 18A). As the level of the positive voltage is increased, there is produced a region where the negative poles of dipole moments start facing the upper surface of the emitter 12 (see FIG. 18B) immediately prior to the point p4 in FIG. 16. When the level is further increased, electrons start being emitted after the point p4 in FIG. 16 (see FIG. 18C). When the positive voltage is increased in the positive direction, the amount of emitted electrons is increased. Substantially at the time the positive voltage exceeds the positive coercive voltage (the point p5), a region where the polarization is inverted again is increased. At the point p6, almost all the accumulated electrons are emitted, and the amount of polarization at this time is essentially the same as the amount of polarization in the initial state.

The characteristics of the electron emitter 10A has have the following features:

(A) If the negative coercive voltage is represented by v1 and the positive coercive voltage by v2, then $$|v1|<|v2|$$

(B) More specifically, $1.5 \times |v1| < |v2|$ (C) If the rate of change of the polarization at the time the negative coercive voltage v1 is applied is represented by $\Delta q1/\Delta v1$ and the rate of change of the amount of positive charges and the rate of change of the polarization at the time the positive coercive voltage v2 is applied is represented by $\Delta q2/\Delta v2$, then $$(\Delta q1/\Delta v1) > (\Delta q2/\Delta v2)$$

(D) If the voltage at which the accumulation of electrons is saturated is represented by v3 and the voltage at which electrons start being emitted by v4, then $$1 \leq |v4|/|v3| \leq 1.5$$

Since the electron emitter 10A according to the first embodiment has the above characteristics, it can easily be applied to a display having a plurality of electron emitters 10A arrayed in association with respective pixels for emitting electrons from the electron emitters 10A to display an image.

A display 100 using electron emitters 10A according to the first embodiment will be described below.

Figure 19:
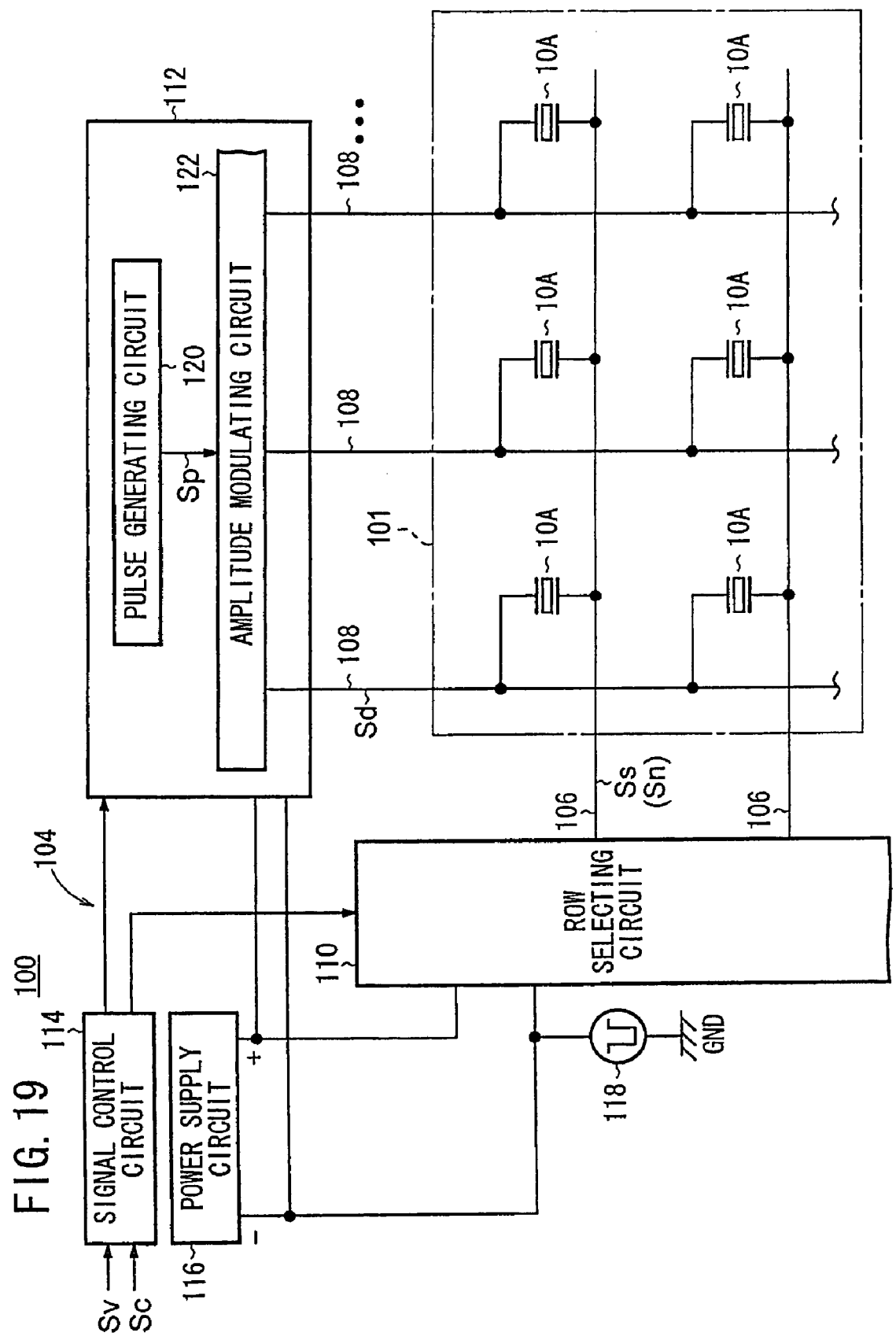
FIG. 19 is a block diagram of a display area and a drive circuit of a display which is constructed using electron emitters according to the first embodiment.

As shown in FIG. 19, the display 100 has a display unit 101 comprising a matrix or staggered pattern of electron emitters 10A corresponding to respective pixels, and a drive circuit 104 for driving the display unit 101. One electron emitter 10A may be assigned to each pixel, or a plurality of electron emitters 10A may be assigned to each pixel. In the present embodiment, it is assumed for the sake of brevity that one electron emitter 10A is assigned to each pixel.

The drive circuit 104 has a plurality of row select lines 106 for selecting rows in the display unit 101 and a plurality of signal lines 108 for supplying pixel signals Sd to the display unit 101.

The drive circuit 104 also has a row selecting circuit 110 for supplying a selection signal Ss selectively to the row select lines 106 to successively select a row of electron emitters 10A, a signal supplying circuit 112 for outputting parallel pixel signals Sd to the signal lines 108 to supply the pixel signals Sd to a row (selected row) selected by the row selecting circuit 110, and a signal control circuit 114 for controlling the row selecting circuit 110 and the signal supplying circuit 112 based on a video signal Sv and a synchronizing signal Sc that are input to the signal control circuit 114.

A power supply circuit 116 (which supplies 50 V and 0 V, for example) is connected to the row selecting circuit 110 and the signal supplying circuit 112. A pulse power supply 118 is connected between a negative line between the row selecting circuit 110 and the power supply circuit 116, and GND (ground). The pulse power supply 118 outputs a pulsed voltage waveform having a reference voltage (e.g., 0 V) during a charge accumulation period Td, to be described later, and a certain voltage (e.g., −400 V) during a light emission period Th.

During the charge accumulation period Td, the row selecting circuit 110 outputs the selection signal Ss to the selected row and outputs a non-selection signal Sn to the unselected rows. During the light emission period Th, the row selecting circuit 110 outputs a constant voltage (e.g., −350 V) which is the sum of a power supply voltage (e.g., 50 V) from the power supply circuit 116 and a voltage (e.g., −400 V) from the pulse power supply 118.

The signal supplying circuit 112 has a pulse generating circuit 120 and an amplitude modulating circuit 122. The pulse generating circuit 120 generates a pulse signal Sp having a constant pulse period and a constant amplitude (e.g., 50 V) during the charge accumulation period-Td, and outputs a reference voltage (e.g., 0 V) during the light emission period Th.

During the charge accumulation period Td, the amplitude modulating circuit 122 amplitude-modulates the pulse signal Sp from the pulse generating circuit 120 depending on the luminance levels of the pixels of the selected row, and outputs the amplitude-modulated pulse signal Sp as the pixel signal for the pixels Sd of the selected row. During the light emission period Th, the amplitude modulating circuit 122 outputs the reference voltage from the pulse generating circuit 120 as it is. The timing control in the amplitude modulating circuit 122 and the supply of the luminance levels of the selected pixels to the amplitude modulating circuit 122 are performed by the signal control circuit 114.

Figure 20C:
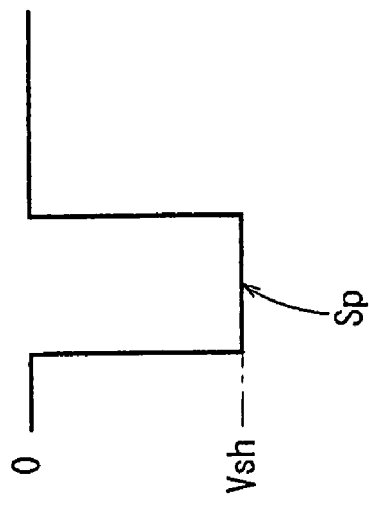
FIGS. 20A through 20C are waveform diagrams illustrative of the amplitude modulation of pulse signals by an amplitude modulating circuit.
Figure 20B:
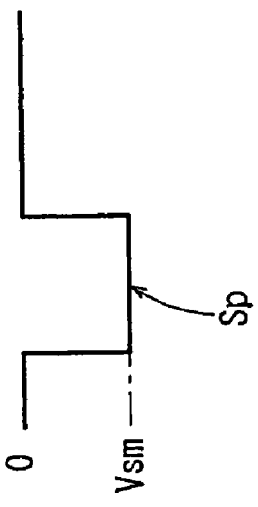
Figure 20A:
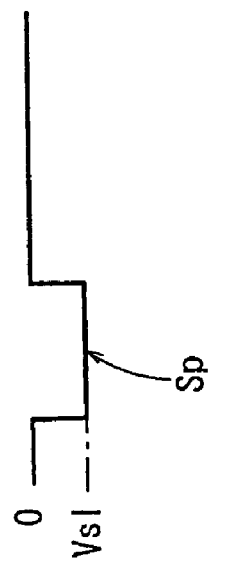

For example, as indicated by three examples shown in FIGS. 20A through 20C, if the luminance level is low, then the amplitude of the pulse signal Sp is set to a low level Vsl (see FIG. 20A), if the luminance level is medium, then the amplitude of the pulse signal Sp is set to a medium level Vsm (see FIG. 20B), and if the luminance level is high, then the amplitude of the pulse signal Sp is set to a high level Vsh (see FIG. 20C). Though the amplitude of the pulse signal Sp is modulated into three levels in the above examples, if the amplitude modulation is applied to the display 100, then the pulse signal Sp is amplitude-modulated to 128 levels or 256 levels depending on the luminance levels of the pixels.

A modification of the signal supplying circuit 112 will be described below with reference to FIGS. 21 through 22C.

Figure 21:
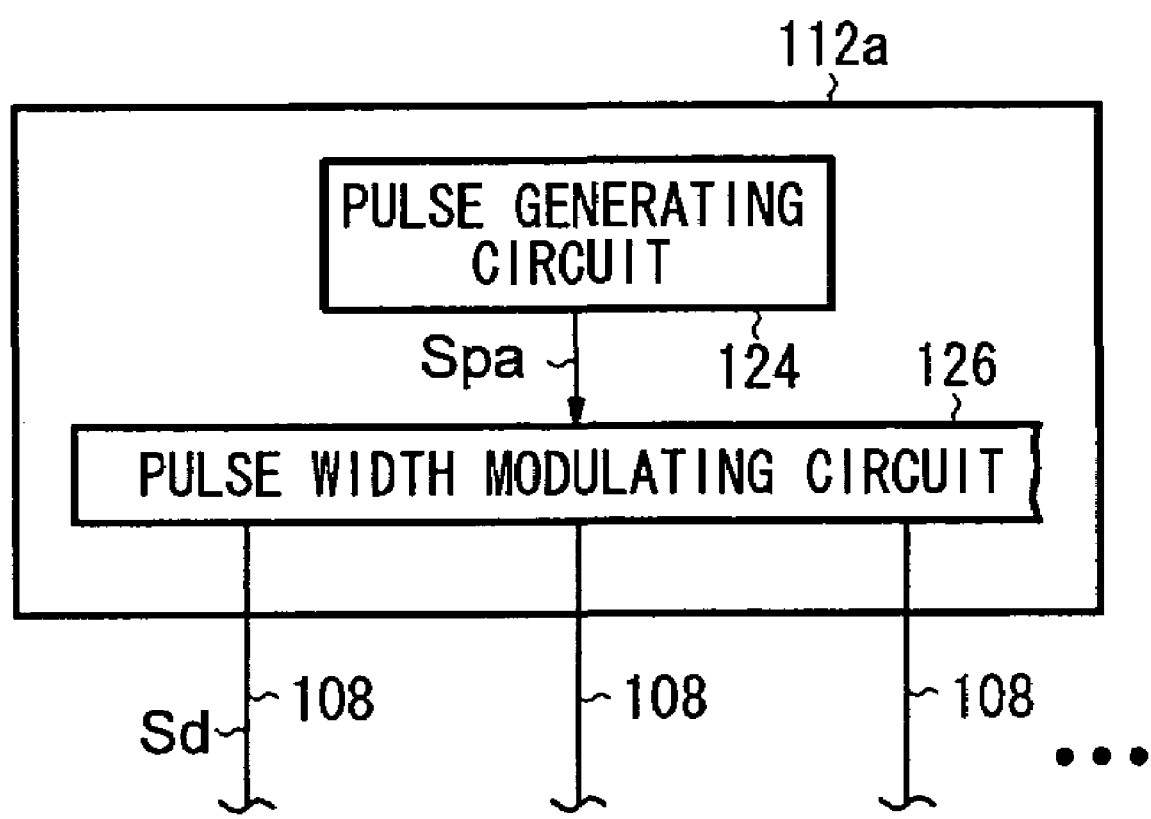
FIG. 21 is a block diagram of a signal supply circuit according to a modification.

As shown in FIG. 21, a modified signal supplying circuit 112a has a pulse generating circuit 124 and a pulse width modulating circuit 126. The pulse generating circuit 124 generates and outputs a pulse signal Spa (indicated by the broken lines in FIGS. 22A through 22C) where the positive-going edge of a voltage waveform (indicated by the solid lines in FIGS. 22A through 22C) applied to the electron emitter 10A is continuously changed in level, during the charge accumulation period Td. The pulse generating circuit 124 outputs a reference voltage during the light emission period Th. During the charge accumulation period Td, the pulse width modulating circuit 126 modulates the pulse width Wp (see FIGS. 22A through 22C) of the pulse signal Spa from the pulse generating circuit 124 depending on the luminance levels of the pixels of the selected row, and outputs the pulse signal Spa with the modulated pulse width Wp as the pixel signal Sd for the pixels of the selected row. During the light emission period Th, the pulse width modulating circuit 126 outputs the reference voltage from the pulse generating circuit 124 as it is. The timing control in the pulse width modulating circuit 126 and the supply of the luminance levels of the selected pixels to the pulse width modulating circuit 126 are also performed by the signal control circuit 114.

Figure 22A:
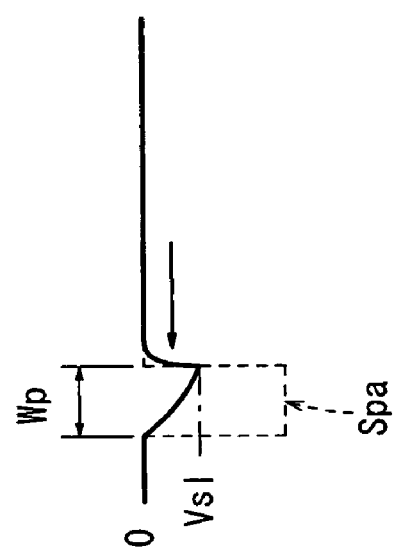
FIG. 22A through 22C are waveform diagrams illustrative of the pulse width modulation of pulse signals by a pulse width modulating circuit.
Figure 22B:
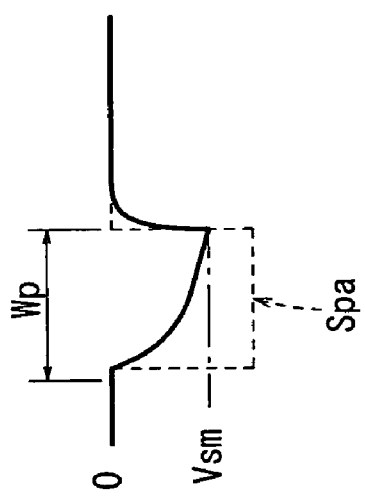
Figure 22C:
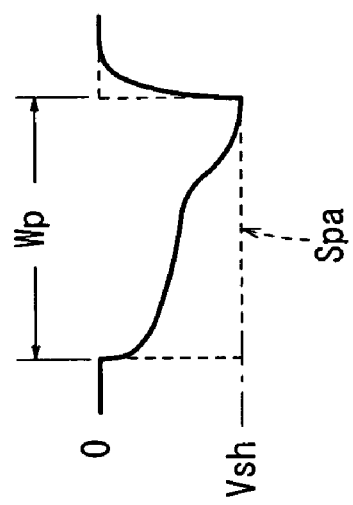

For example, as indicated by three examples shown in FIGS. 22A through 22C, if the luminance level is low, then the pulse width Wp of the pulse signal Sp is set to a short width, setting the substantial amplitude to a low level Vsl (see FIG. 22A), if the luminance level is medium, then the pulse width Wp of the pulse signal Sp is set to a medium width, setting the substantial amplitude to a medium level Vsm (see FIG. 22B), and if the luminance level is high, then the pulse width Wp of the pulse signal Sp is set to a long width, setting the substantial amplitude to a high level Vsh (see FIG. 22C) Though the pulse width Wp pf the pulse signal Sp is modulated into three levels in the above examples, if the amplitude modulation is applied to the display 100, then the pulse signal Sp is pulse-width-modulated to 128 levels or 256 levels depending on the luminance levels of the pixels.

Figure 23A:
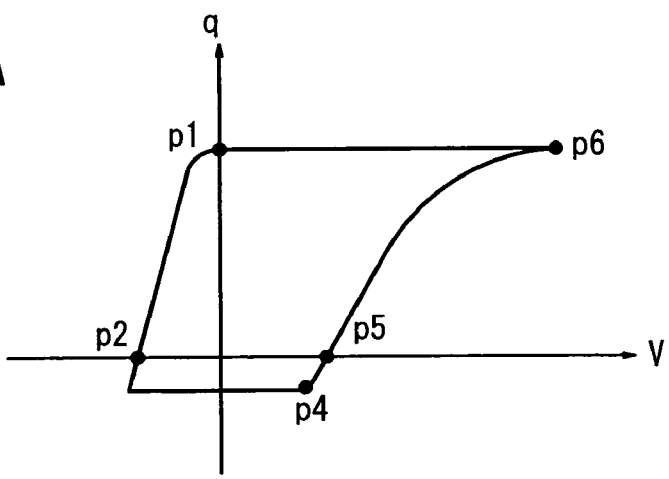
FIG. 23A is a diagram showing a hysteresis curve plotted when a voltage Vsl shown in FIG. 20A or 22A is applied.
Figure 23B:
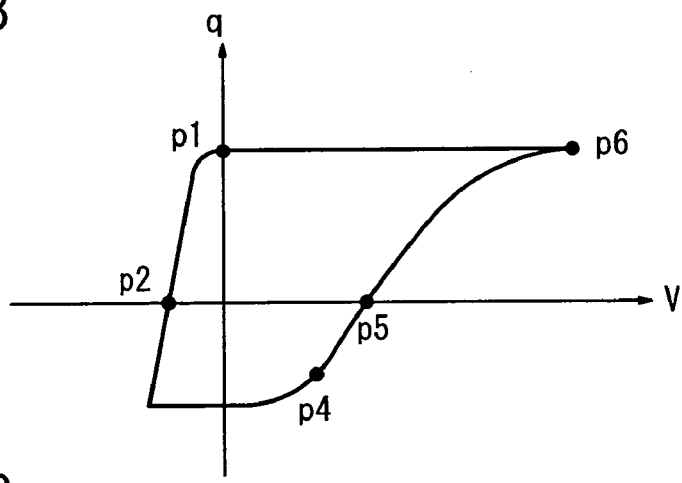
FIG. 23B is a diagram showing a hysteresis curve plotted when a voltage Vsm shown in FIG. 20B or 22B is applied.

Changes of the characteristics at the time the level of the negative voltage for the accumulation of electrons will be reviewed in relation to the three examples of amplitude modulation on the pulse signal Sp shown in FIGS. 20A through 20C and the three examples of pulse width modulation of the pulse signal Spa shown in FIGS. 22A through 22C. At the level Vsl of the negative voltage shown in FIGS. 20A and 22A, the amount of electrons accumulated in the electron emitter 12 is small as shown in FIG. 23A. At the level Vsm of the negative voltage shown in FIGS. 20B and 22B, the amount of electrons accumulated in the electron emitter 12 is medium as shown in FIG. 23B. At the level Vsh of the negative voltage shown in FIGS. 20C and 22C, the amount of electrons accumulated in the electron emitter 12 is large and is substantially saturated as shown in FIG. 23C.

Figure 23C:
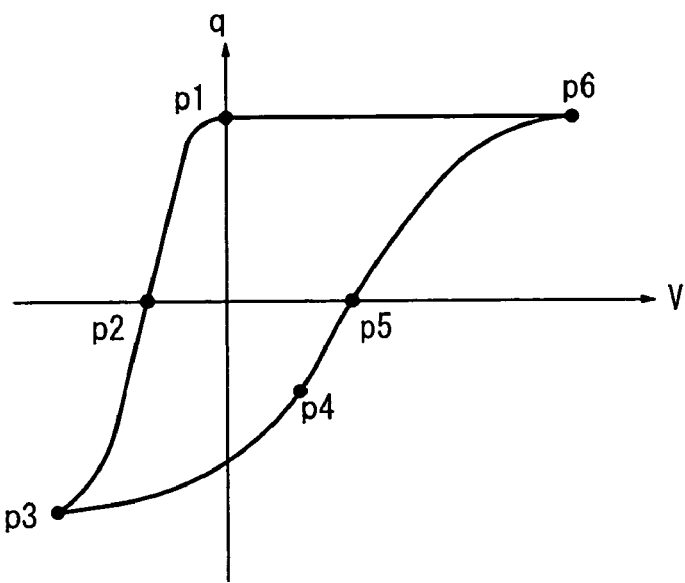
FIG. 23C is a diagram showing a hysteresis curve plotted when a voltage Vsh shown in FIG. 20C or 22C is applied.

However, as shown in FIGS. 23A through 23C, the voltage level at the point p4 where electrons start being emitted is substantially the same. That is, even if the applied voltage changes to the voltage level indicated at the point p4 after electrons are accumulated, the amount of accumulated electrons does not change essentially. It can thus be seen that a memory effect has been caused.

Figure 24:
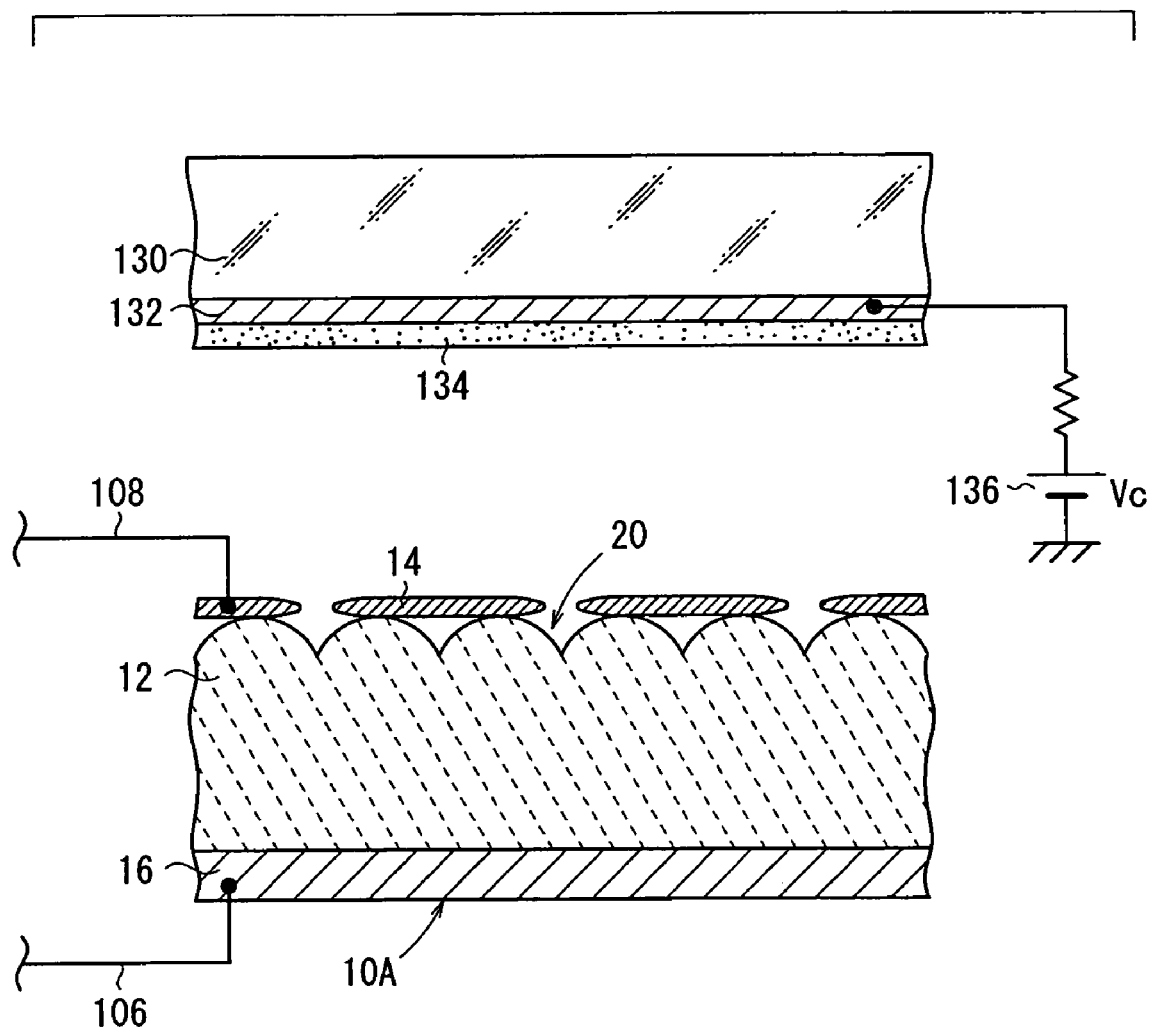
FIG. 24 is a view showing a layout of a collector electrode, a phosphor, and a transparent plate on the upper electrode.

For using the electron emitter 10A as a pixel of the display 100, as shown in FIG. 24, a transparent plate 130 made of glass or acrylic resin is placed above the upper electrode 14, and a collector electrode 132 in the form of a transparent electrode, for example, is placed on the reverse side of the transparent plate 130 (which faces the upper electrode 14), the collector electrode 132 being coated with a phosphor 134. A bias voltage source 136 (collector voltage Vc) is connected to the collector electrode 32 through a resistor. The electron emitter 10A is naturally placed in a vacuum. The vacuum level in the atmosphere should preferably in the range from $10^2$ to $10^{-6}$ Pa and more preferably in the range from $10^{-3}$ to $10^{-5}$ Pa.

The reason f or the above range is that in a lower vacuum, (1) many gas molecules would be present in the space, and a plasma can easily be generated and, if too intensive of a plasma were generated, many positive ions thereof would impinge upon the upper electrode 14 and damage the same, and (2) emitted electrons would tend to impinge upon gas molecules prior to arrival at the collector electrode 132, failing to sufficiently excite the phosphor 134 with electrons that are sufficiently accelerated under the collector voltage Vc.

In a higher vacuum, though electrons would be liable to be emitted from a point where electric field concentrates, structural body supports and vacuum seals would be large in size, posing disadvantages on efforts to make the emitter smaller in size.

Figure 25:
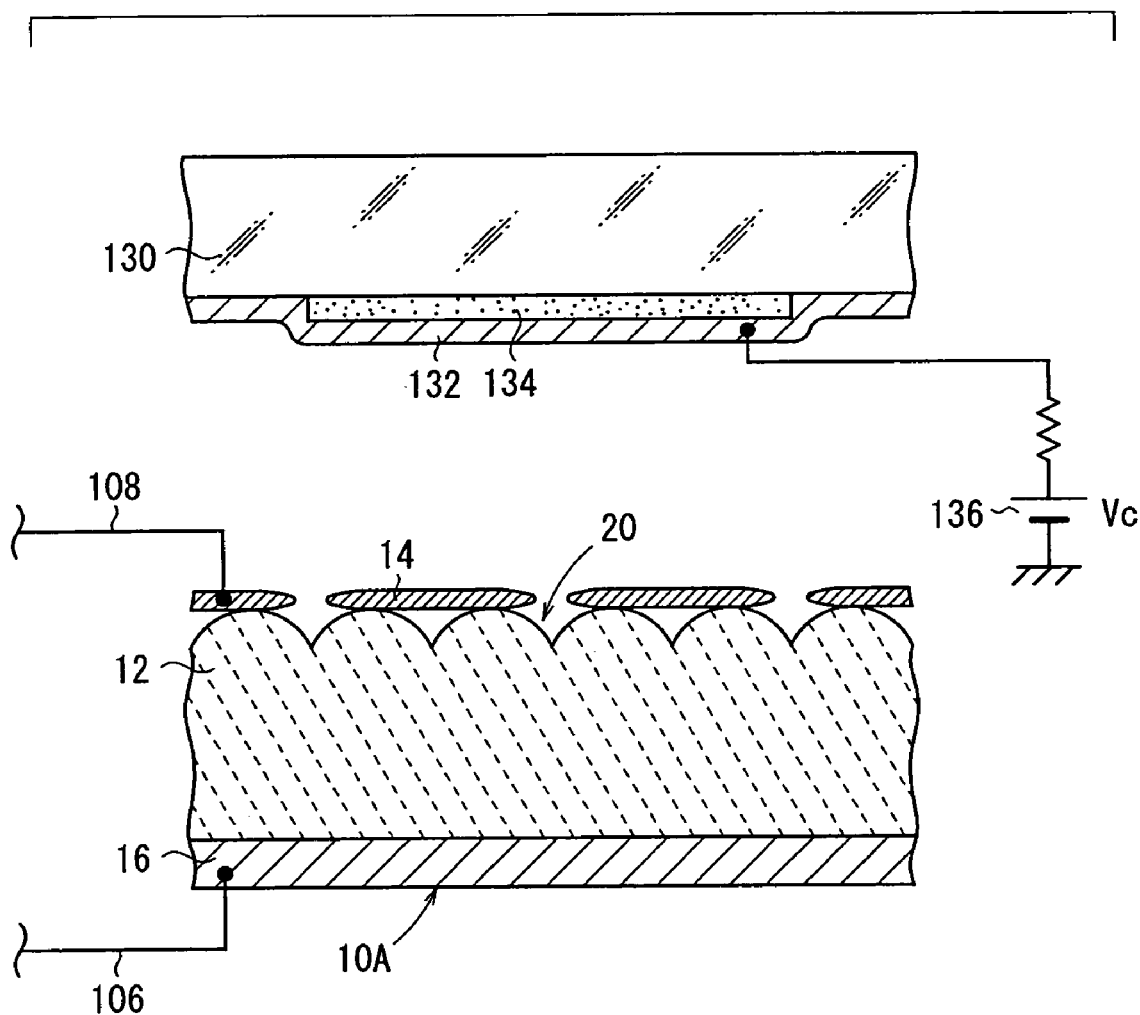
FIG. 25 is a view showing another layout of a collector electrode, a phosphor, and a transparent plate on the upper electrode.

In the embodiment shown in FIG. 24, the collector electrode 132 is formed on the reverse side of the transparent plate 130, and the phosphor 134 is formed on the surface of the collector electrode 132 (which faces the upper electrode 14). According to another arrangement, as shown in FIG. 25, the phosphor 134 may be formed on the reverse side of the transparent plate 130, and the collector electrode 132 may be formed in covering relation to the phosphor 134.

Such another arrangement is for use in a CRT or the like where the collector electrode 132 functions as a metal back. Electrons emitted from the emitter 12 pass through the collector electrode 132 into the phosphor 134, exciting the phosphor 134. Therefore, the collector electrode 132 is of a thickness which allows electrons to pass therethrough, preferably 100 nm or less thick. As the kinetic energy of the emitted electrons is larger, the thickness of the collector electrode 132 may be increased.

This arrangement offers the following advantages:

(a) If the phosphor 134 is not electrically conductive, then the phosphor 134 is prevented from being charged (negatively), and an electric field for accelerating electrons can be maintained.

(b) The collector electrode 132 reflects light emitted from the phosphor 134, and discharges the light emitted from the phosphor 134 efficiently toward the transparent plate 130 (light emission surface).

(c) Electrons are prevented from impinging excessively upon the phosphor 134, thus preventing the phosphor 134 from being deteriorated and from producing a gas.

Four experimental examples (first through fourth experimental examples) of the electron emitter 10A according to the first embodiment will be shown.

Figure 26A:
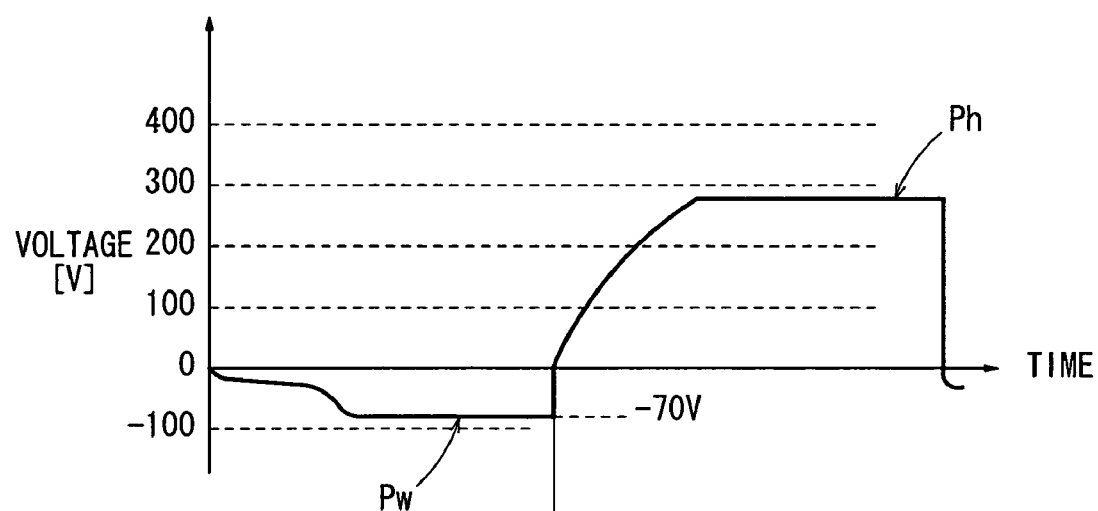
FIG. 26A is a diagram showing the waveform of a write pulse and a turn-on pulse that are used in a first experimental example (an experiment for observing the emission of electrons from an electron emitter)
Figure 26B:
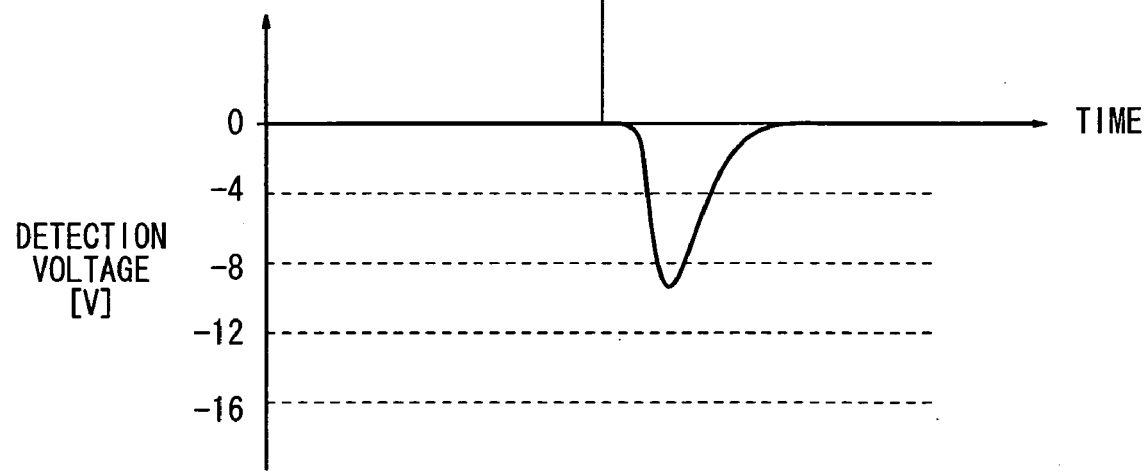
FIG. 26B is a diagram showing the waveform of a detected voltage of a light-detecting device, which is representative of the emission of electrons from the electron emitter in the first experimental example.

According to the first experimental example, the emission of electrons from the electron emitter 10A was observed. Specifically, as shown in FIG. 26A, a write pulse Pw having a voltage of −70 V was applied to the electron emitter 10A to cause the electron emitter 10A to accumulate electrons, and thereafter a turn-on pulse Ph having a voltage of 280 V was applied to cause the electron emitter 10A to emit electrons. The emission of electrons was measured by detecting the light emission from the phosphor 134 with a light-detecting device (photodiode). The detected waveform is shown in FIG. 26B. The write pulse Pw and the turn-on pulse Ph had a duty cycle of 50%.

It can be seen from the first experimental example that light starts to be emitted on a positive-going edge of the turn-on pulse Ph and the light emission is finished in an initial stage of the turn-on pulse Ph. Therefore, it is considered that the light emission will not be affected by shortening the period of the turn-on pulse Ph. This period shortening will lead to a reduction in the period in which to apply the high voltage, resulting in a reduction in power consumption.

Figure 27:
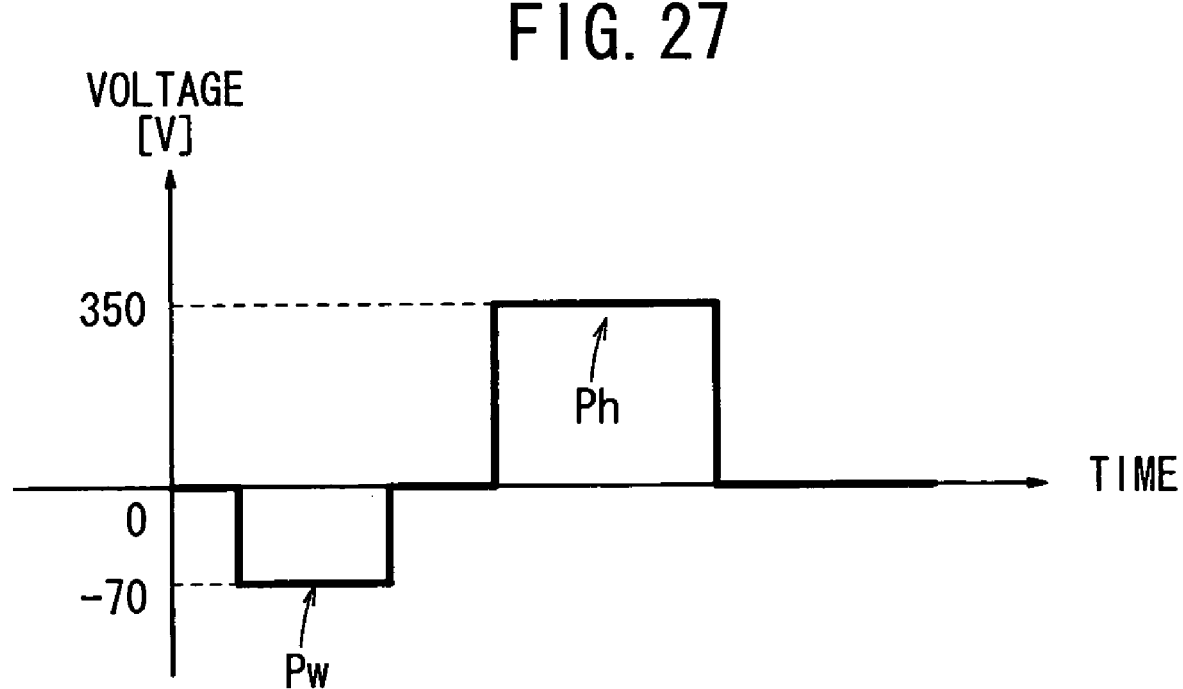
FIG. 27 is a diagram showing the waveform of a write pulse and a turn-on pulse that are used in second through fourth experimental examples.

According to the second experimental example, how the amount of electrons emitted from the electron emitter 10A is changed by the amplitude of the write pulse Pw shown in FIG. 27 was observed. Changes in the amount of emitted electrons were measured by detecting the light emission from the phosphor 134 with a light-detecting device (photodiode), as with the first experimental example. The experimental results are shown in FIG. 28.

Figure 28:
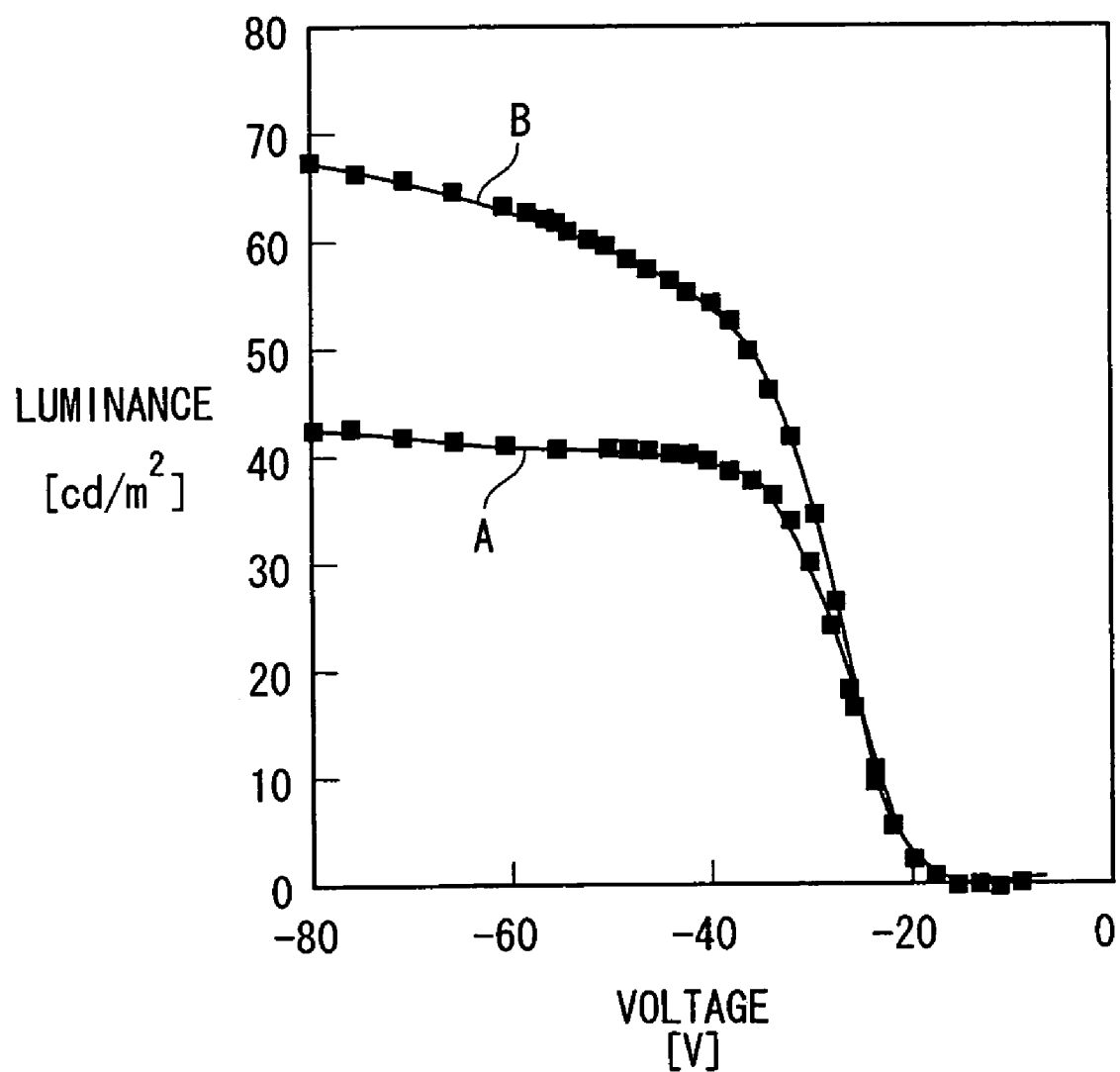
FIG. 28 is a characteristic diagram showing the results of a second experimental example (an experiment for observing how the amount of electrons emitted from the electron emitter changes depending on the amplitude of a write pulse)

In FIG. 28, the solid-line curve A represents the characteristics at the time the turn-on pulse Ph had an amplitude of 200 V and the write pulse Pw had an amplitude changing from −10 V to −80 V, and the solid-line curve B represents the characteristics at the time the turn-on pulse Ph had an amplitude of 350 V and the write pulse Pw had an amplitude changing from −10 V to −80 V.

As illustrated in FIG. 28, when the write pulse Pw is changed from −20 V to −40 V, it can be understood that the light emission luminance changes substantially linearly. A comparison between the amplitudes 350 V and 200 V of the turn-on pulse Ph in particular indicates that a change in the light emission luminance in response to the write pulse Pw at the time the amplitude of the turn-on pulse Ph is 350 V has a wider dynamic range, which is advantageous for increased luminance and contrast for the display of images. This tendency appears to be more advantageous as the amplitude of the turn-on pulse Ph increases in a range until the light emission luminance is saturated with respect to the setting of the amplitude of the turn-on pulse Ph. It is preferable to set the amplitude of the turn-on pulse Ph to an optimum value in relation to the withstand voltage and power consumption of the signal transmission system.

According to the third experimental example, how the amount of electrons emitted from the electron emitter 10A is changed by the amplitude of the turn-on pulse Ph shown in FIG. 27 was observed. Changes in the amount of emitted electrons were measured by detecting the light emission from the phosphor 134 with a light-detecting device (photodiode), as with the first experimental example. The experimental results are shown in FIG. 29.

Figure 29:
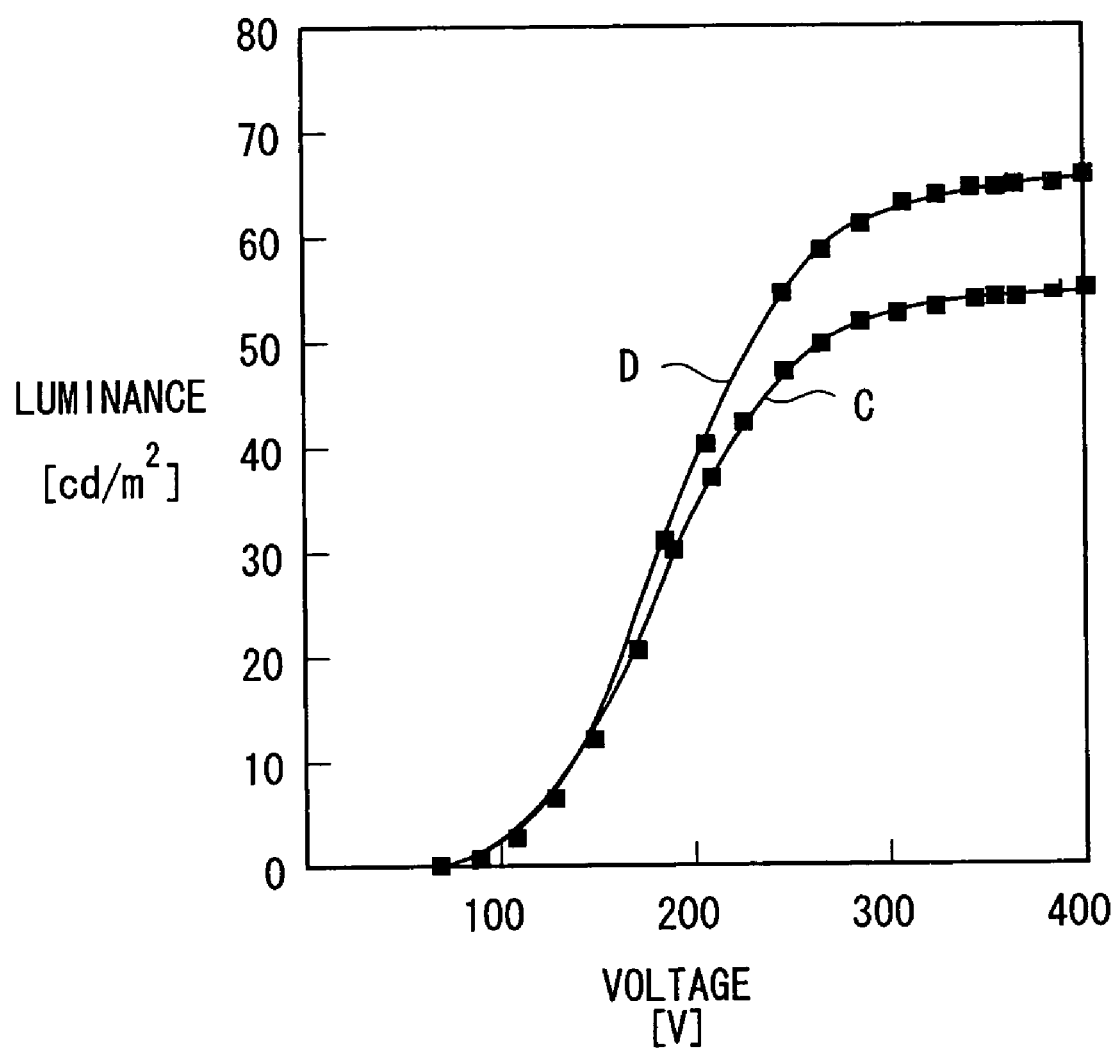
FIG. 29 is a characteristic diagram showing the results of a third experimental example (an experiment for observing how the amount of electrons emitted from the electron emitter changes depending on the amplitude of a turn-on pulse)

In FIG. 29, the solid-line curve C represents the characteristics at the time the write pulse Pw had an amplitude of −40 V and the turn-on pulse Ph had an amplitude changing from 50 V to 400 V, and the solid-line curve D represents the characteristics at the time the write pulse Pw had an amplitude of −70 V and the turn-on pulse Ph had an amplitude changing from 50 V to 400 V.

As illustrated in FIG. 29, when the turn-on pulse Ph is changed from 100 V to 300 V, it can be understood that the light emission luminance changes substantially linearly. A comparison between the amplitudes −40 V and −70 V of the write pulse Pw in particular indicates that a change in the light emission luminance in response to the turn-on pulse Ph at the time the amplitude of the write pulse Pw is −70 V has a wider dynamic range, which is advantageous for increased luminance and contrast for the display of images. This tendency appears to be more advantageous as the amplitude of the write pulse Pw increases in a range until the light emission luminance is saturated with respect to the setting of the amplitude of the write pulse Pw. It is preferable also in this case to set the amplitude (absolute value) of the write pulse Pw to an optimum value in relation to the withstand voltage and power consumption of the signal transmission system.

According to the fourth experimental example, how the amount of electrons emitted from the electron emitter 10A is changed by the level of the collector voltage Vc shown in FIG. 24 or 25 was observed. Changes in the amount of emitted electrons were measured by detecting the light emission from the phosphor 134 with a light-detecting device (photodiode), as with the first experimental example. The experimental results are shown in FIG. 30.

Figure 30:
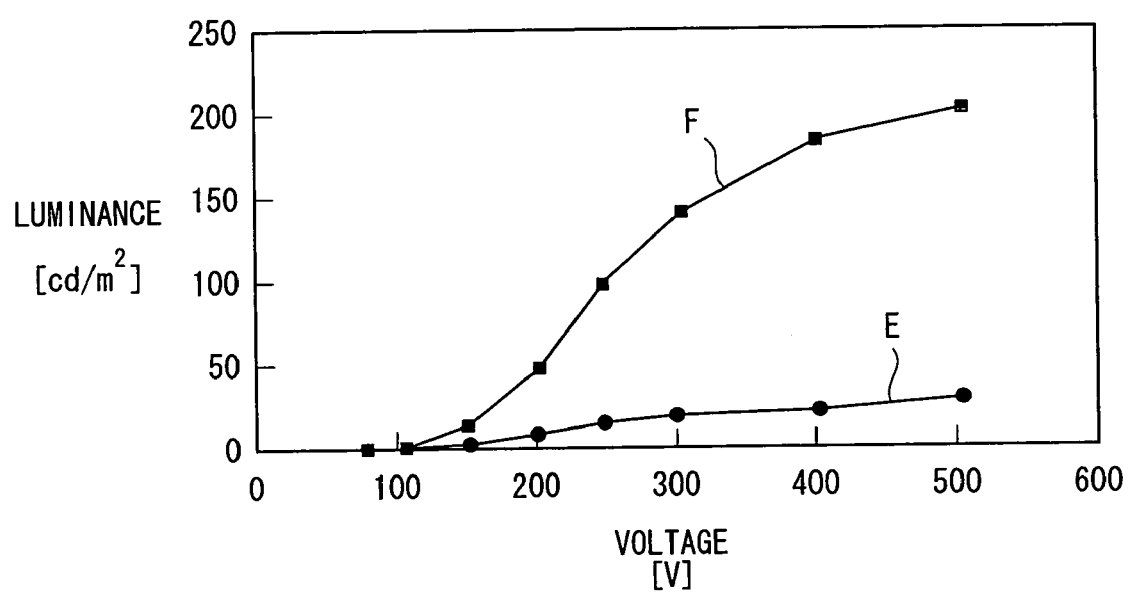
FIG. 30 is a characteristic diagram showing the results of a fourth experimental example (an experiment for observing how the amount of electrons emitted from the electron emitter changes depending on the level of a collector voltage)

In FIG. 30, the solid-line curve E represents the characteristics at the time the level of the collector voltage Vc was 3 kV and the amplitude of the turn-on pulse Ph was changed from 80 V to 500 V, and the solid-line curve F represents the characteristics at the time the level of the collector voltage Vc was 7 kV and the amplitude of the turn-on pulse Ph was changed from 80 V to 500 V.

As illustrated in FIG. 30, it can be understood that a change in the light emission luminance in response to the turn-on pulse Ph has a wider dynamic range when the collector voltage Vc is 7 kV than when the collector voltage Vc is 3 kV, which is advantageous for increased luminance and contrast for the display of images. This tendency appears to be more advantageous as the level of the collector voltage Vc increases. It is preferable also in this case to set the level of the collector voltage Vc to an optimum value in relation to the withstand voltage and power consumption of the signal transmission system.

Figure 31:
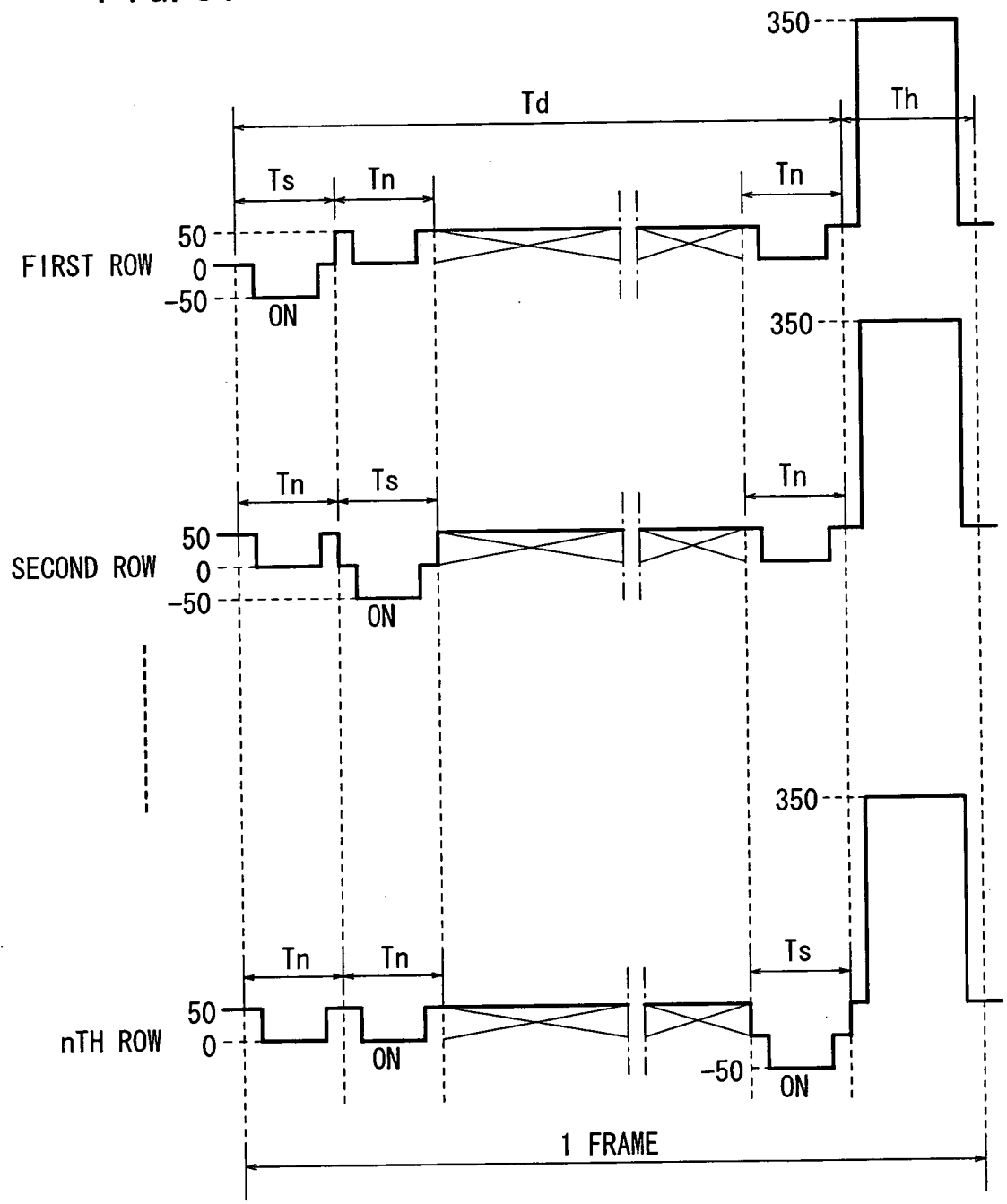
FIG. 31 is a timing chart illustrative of a drive method for the display.

A drive method for the display 100 will be described below with reference to FIGS. 31 and 32. FIG. 31 shows operation of pixels in the first row and the first column, the second row and the first column, and the nth row and the first column. The electron emitter 10A used in the first drive method has such characteristics that the coercive voltage v1 at the point p2 shown in FIG. 16 is −20 V, for example, the coercive voltage v2 at the point p5 is +70 V, the voltage v3 at the point p3 is −50 V, and the voltage v4 at the point p4 is +50 V.

As shown in FIG. 31, if the period in which to display one image is defined as one frame, then one charge accumulation period Td and one light emission period Th are included in one frame, and n selection periods Ts are included in one charge accumulation period Td. Since each selection period Ts becomes a selection period Ts for a corresponding row, it becomes a non-selection period Tn for non-corresponding n−1 rows.

According to this drive method, all the electron emitters 10A are scanned in the charge accumulation period Td, and voltages depending on the luminance levels of corresponding pixels are applied to a plurality of electron emitters 10A which correspond to pixels to be turned on (to emit light), thereby accumulating charges (electrons) in amounts depending on the luminance levels of the corresponding pixels in the electron emitters 12 which correspond to the pixels to be turned on. In the next light emission period Th, a constant voltage is applied to all the electron emitters 10A to cause the electron emitters 10A which correspond to the pixels to be turned on to emit electrons in amounts depending on the luminance levels of the corresponding pixels, thereby emitting light from the pixels to be turned on.

More specifically, as shown in FIG. 32, in the selection period Ts for the first row, a selection signal Ss of 50 V, for example, is supplied to the row selection line 106 of the first row, and a non-selection signal Sn of 0 V, for example, is applied to the row selection lines 106 of the other rows. A pixel signal Sd supplied to the signal lines 108 of the pixels to be turned on (to emit light) of all the pixels of the first row has a voltage in the range from 0 V to 30 V, depending on the luminance levels of the corresponding pixels. If the luminance level is maximum, then the voltage of the pixel signal Sd is 0 V. The pixel signal Sd is modulated depending on the luminance level by the amplitude modulating circuit 122 shown in FIG. 19 or the pulse width modulating circuit 126 shown in FIG. 21.

Thus, a voltage ranging from −50 V to −20 V depending on the luminance level is applied between the upper and lower electrodes 14, 16 of the electron emitter 10A which corresponds to each of the pixels to be turned on in the first row. As a result, each electron emitter 10A accumulates electrons depending on the applied voltage. For example, the emitter 12 corresponding to the pixel in the first row and the first column is in a state at the point p3 shown in FIG. 16 as the luminance level of the pixel is maximum, and the portion of the emitter 12 which is exposed through the through region 20 of the upper electrode 14 accumulates a maximum amount of electrons.

A pixel signal Sd supplied to the electron emitters 10A which correspond to pixels to be turned off (to extinguish light) has a voltage of 50 V, for example. Therefore, a voltage of 0 V is applied to the electron emitters 10A which correspond to pixels to be turned off, bringing those electron emitters 10A into a state at the point p1 shown in FIG. 16, so that no electrons are accumulated in those electron emitters 10A.

After the supply of the pixel signal Sd to the first row is finished, in the selection period Ts for the second row, a selection signal Ss of 50 V is supplied to the row selection line 106 of the second row, and a non-selection signal Sn of 0 V is applied to the row selection lines 106 of the other rows. In this case, a voltage ranging from −50 V to −20 V depending on the luminance level is also applied between the upper and lower electrodes 14, 16 of the electron emitter 10A which corresponds to each of the pixels to be turned on. At this time, a voltage ranging from 0 V to 50 V is applied between the upper and lower electrodes 14, 16 of the electron emitter 10A which corresponds to each of unselected pixels in the first row, for example. Since this voltage is of a level not reaching the point p4 in FIG. 16, no electrons are emitted from the electron emitters 10A which correspond to the pixels to be turned on in the first row. That is, the unselected pixels in the first row are not affected by the pixel signal that is supplied to the selected pixels in the second row.

Similarly, in the selection period Ts for the nth row, a selection signal Ss of 50 V is supplied to the row selection line 106 of the nth row, and a non-selection signal Sn of 0 V is applied to the row selection lines 106 of the other rows. In this case, a voltage ranging from −50 V to −20 V depending on the luminance level is also applied between the upper and lower electrodes 14, 16 of the electron emitter 10A which corresponds to each of the pixels to be turned on. At this time, a voltage ranging from 0 V to 50 V is applied between the upper and lower electrodes 14, 16 of the electron emitter 10A which corresponds to each of unselected pixels in the first through (n−1)th rows. However, no electrons are emitted from the electron emitters 10A which correspond to the pixels to be turned on, of those unselected pixels.

Figure 18C:
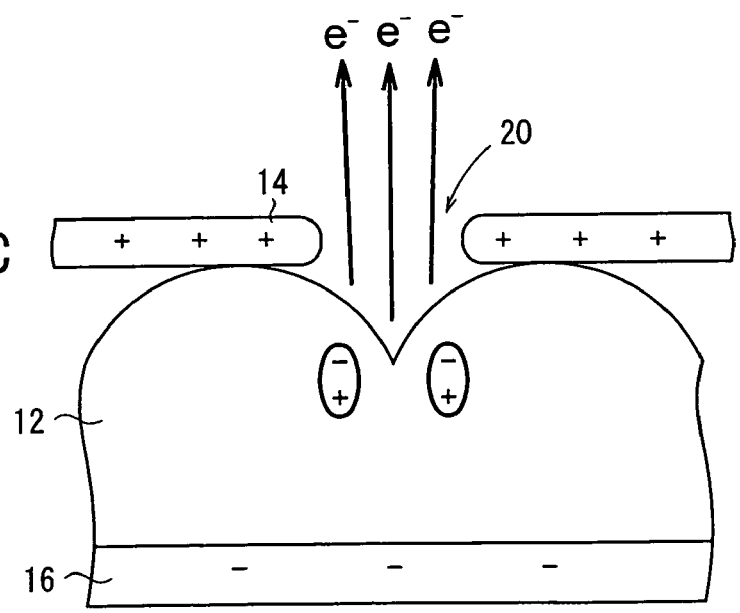
FIG. 18C is a view illustrative of a state from the point p4 to a point p6 shown in FIG. 16.

After elapse of the selection period Ts for the nth row, it is followed by the light emission period Th. In the light emission period Th, a reference voltage (e.g., 0 V) is applied from the signal supplying circuit 112 to the upper electrodes 14 of all the electron emitters 10A, and a voltage of −350 V (the sum of the voltage of −400 V from the pulse power supply 118 and the power supply voltage 50 V from the row selecting circuit 110) is applied to the lower electrodes 16 of all the electron emitters 10A. Thus, a high voltage (+350 V) is applied between the upper and lower electrodes 14, 16 of all the electron emitters 10A. All the electron emitters 10A are now brought into a state at the point p6 shown in FIG. 16. As shown in FIG. 18C, electrons are emitted from the portion of the emitter 12 where the electrons have been accumulated, through the through region 20. Electrons are also emitted from near the outer peripheral portion of the upper electrode 14.

Electrons are thus emitted from the electron emitters 10A which correspond to the pixels to be turned on, and the emitted electrons are led to the collector electrodes 132 which correspond to those electron emitters 10A, exciting the corresponding phosphors 134 which emit light. In this manner, an image is displayed on the surface of the transparent plate 130.

Subsequently, electrons are accumulated in the electron emitters 10A which correspond to the pixels to be turned on (to emit light) in the charge accumulation period Td, and the accumulated electrons are emitted for fluorescent light emission in the light emission period Th, for thereby displaying a moving image or a still image on the surface of the transparent plate 130.

Thus, the electron emitter according to the first embodiment can easily be applied to the display 100 which has a plurality of electron emitters 10A arrayed in association with respective pixels for emitting electrons from the electron emitters 10A to display an image.

For example, as described above, in the charge accumulation period Td in one frame, all the electron emitters 10A are scanned, and voltages depending on the luminance levels of corresponding pixels are applied to a plurality of electron emitters 10A which correspond to pixels to be turned on, thereby accumulating charges in amounts depending on the luminance levels of the corresponding pixels in the electron emitters 10A which correspond to the pixels to be turned on. In the next light emission period Th, a constant voltage is applied to all the electron emitters 10A to cause the electron emitters 10A which correspond to the pixels to be turned on to emit electrons in amounts depending on the luminance levels of the corresponding pixels, thereby emitting light from the pixels to be turned on.

According to the first embodiment, the voltage V3 at which the accumulation of electrons is saturated and the voltage V4 at which electrons start being emitted are related to each other by $1 \leq |V4|/|V3| \leq 1.5$.

Usually, when the electron emitters 10A are arranged in a matrix and selected row by row in synchronism with the horizontal scanning period, and pixel signals Sd depending on the luminance levels of pixels are supplied to the selected electron emitters 10A, the pixel signals Sd are also supplied to unselected pixels.

If the unselected electron emitters 10A are affected by the pixel signals Sd and emit electrons, then problems arise in that the quality of displayed images is degraded and the contrast thereof is lowered.

According to the first embodiment, on account of the characteristics described above, even if such a simple voltage relationship is employed that the voltage levels of the pixel signals Sd supplied to selected electron emitters 10A are set to desired voltages in the range from the reference voltage to the voltage V3 and signals that are of opposite polarity to the pixel signals Sd, for example, are supplied to unselected electron emitters 10A, the unselected pixels are not affected by the pixel signals Sd supplied to the selected pixels, and a memory effect is achieved at each pixel for higher luminance and higher contrast.

In the display 100, necessary charges are accumulated in all the electron emitters 10A in the charge accumulation period Td. In the subsequent light emission period Th, a voltage required to emit electrons is applied to all the electron emitters 10A to cause a plurality of electron emitters 12 which correspond to the pixels to be turned on to emit the electrons for thereby emitting light from the pixels to be turned on.

Usually, if pixels are made up of electron emitters 10A, then a high voltage needs to be applied to the electron emitters 10A to emit light from the pixels. Therefore, for accumulating charges in the pixels and emitting light from the pixels when the pixels are scanned, a high voltage needs to be applied to the pixels during a period (e.g., one frame) for displaying one image, resulting in the problem of increased electric power consumption. Circuits for selecting electron emitters 10A and supplying the pixel signals Sd to the selected electron emitters 10A need to be able to handle the high voltage.

According to the present embodiment, after charges have been accumulated in all the electron emitters 10A, a voltage is applied to all the electron emitters 10A, emitting light from the pixels which correspond to the electron emitters 10A to be turned on.

Therefore, the period Th during which a voltage (emission voltage) for emitting electrons is applied to all the electron emitters 10A is necessarily shorter than one frame. As can be seen from the first experimental example shown in FIGS. 26A and 26B, since the period during which to apply the emission voltage can be reduced, the power consumption can be made much smaller than if charges are accumulated and light is emitted when the pixels are scanned.

Because the period Td for accumulating charges in electron emitters 10A and the period Th for emitting electrons from electron emitters 10A which correspond to the pixels to be turned on are separated from each other, the circuit for applying voltages depending on luminance levels to the electron emitters 10A can be driven at a low voltage.

The pixel signal depending on an image and the selection signal Ss/non-selection signal Sn in the charge accumulation period Td need to be applied for each row or each column. As can be seen from the above embodiment, as the drive voltage may be of a few tens of volts, an inexpensive multi-output driver for use with fluorescent display tubes may be used. In the light emission period Th, a voltage for emitting sufficient electrons is likely to be higher than the drive voltage. Since all the pixels to be turned on may be driven altogether, no multi-output circuit component is required. For example, a one-output drive circuit in the form of a discrete component having a high withstand voltage may be sufficient. Therefore, the drive circuit may be inexpensive and may be small in circuit scale.

An electron emitter 10B according to a second embodiment will be described below with reference to FIG. 33.

Figure 33:
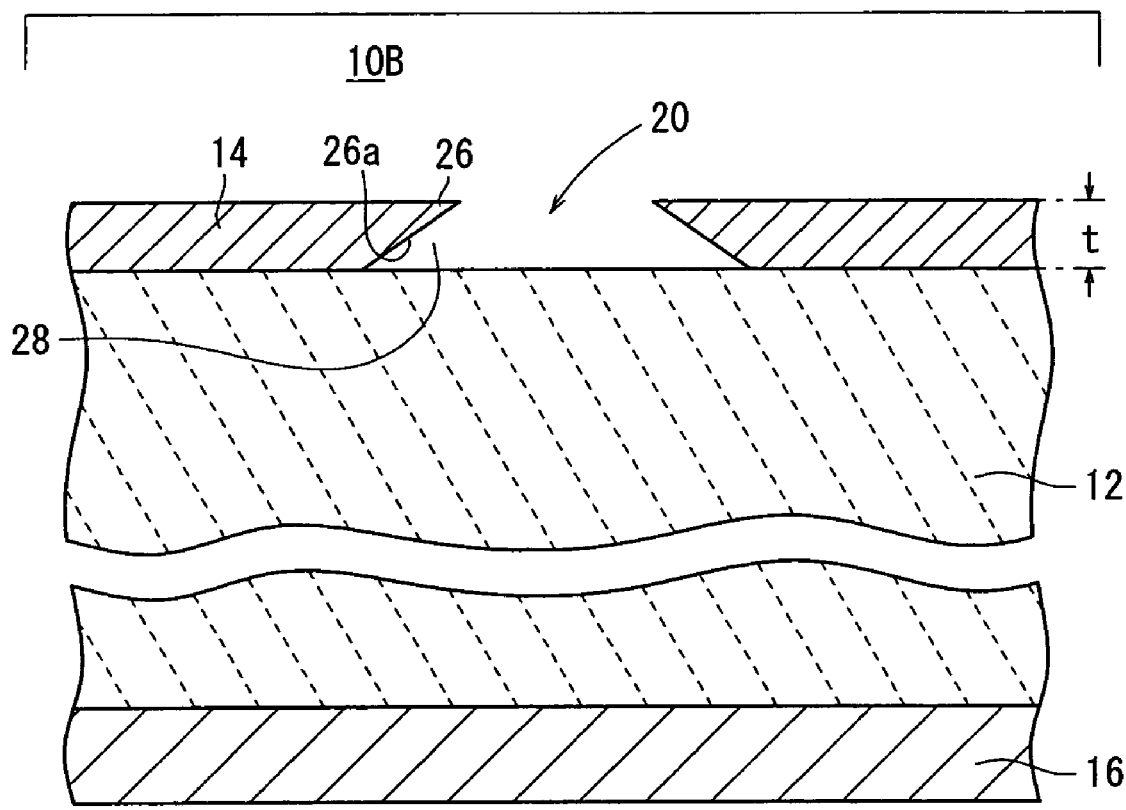
FIG. 33 is a fragmentary cross-sectional view of an electron emitter according to a second embodiment.

As shown in FIG. 33, the electron emitter 10B according to the second embodiment is of an arrangement that is essentially the same as the electron emitter 10A according to the first embodiment, but is characterized in that the upper electrode 14 has a thickness t greater than 40 μm, and the through region 20 is artificially formed by etching (wet etching or dry etching), liftoff, laser, etc. The through region 20 may be shaped as the hole 32, the recess 44, or the slit 48.

The lower surface 26a of the peripheral portion 26 of the through region 20 in the upper electrode 14 is inclined progressively upwardly toward the center of the through region 20. This shape may simply be formed by liftoff, for example.

The electron emitter 10B according to the second embodiment is capable of easily producing a high electric field concentration as with the electron emitter 10A according to the first embodiment. The electron emitter 10B according to the second embodiment is also capable of providing many electron emission regions for a larger output and higher efficiency of the electron emission, and can be driven at a lower voltage (lower power consumption)

Figure 34:
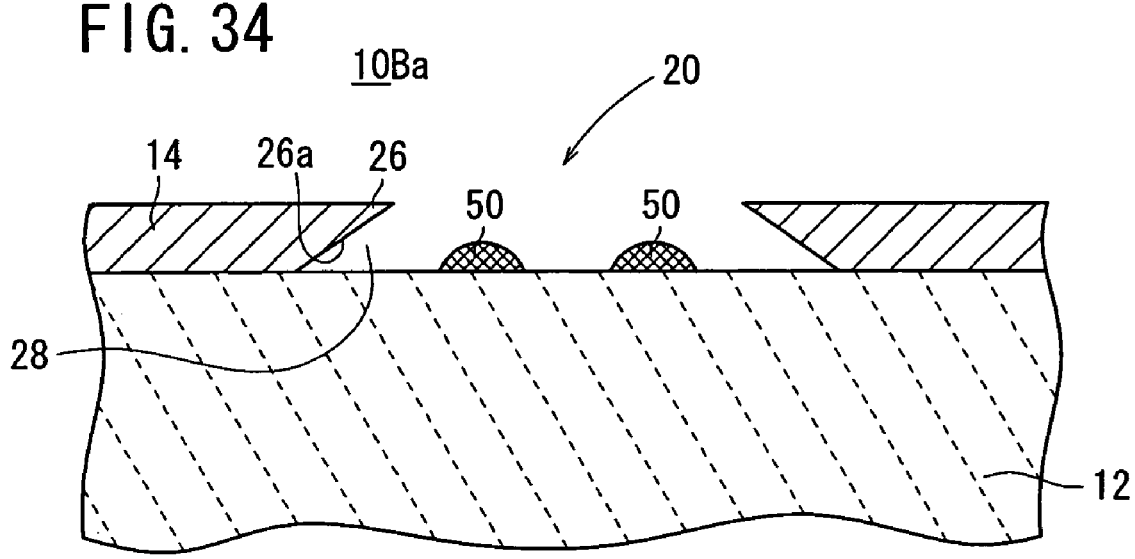
FIG. 34 is a fragmentary cross-sectional view of a first modification of the electron emitter according to the second embodiment.

In an electron emitter 10Ba according to a first modification shown in FIG. 34, floating electrodes 50 may be present on a region of the upper surface of the emitter 12 which corresponds to the through region 20.

Figure 35:
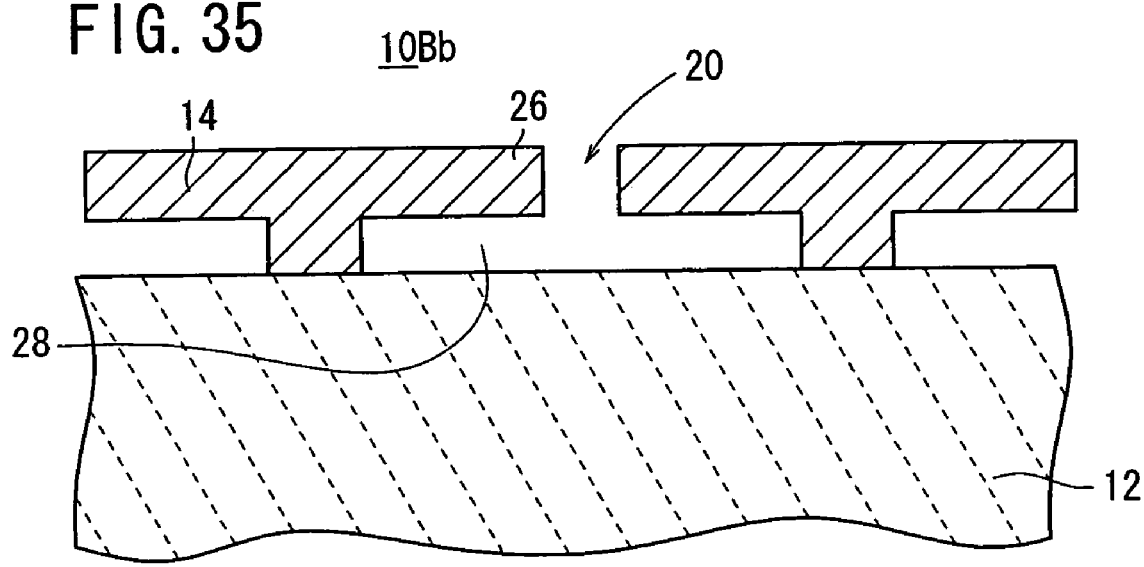
FIG. 35 is a fragmentary cross-sectional view of a second modification of the electron emitter according to the second embodiment.

In an electron emitter 10Bb according to a second modification shown in FIG. 35, an electrode having a substantially T-shaped cross-sectional shape may be formed as the upper electrode 14.

Figure 36:
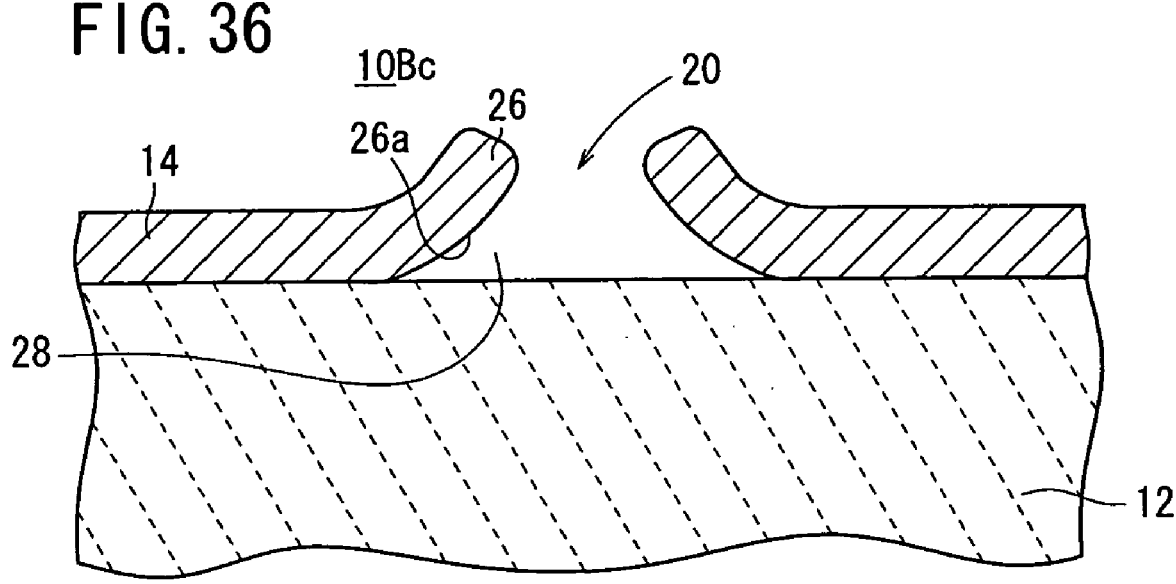
FIG. 36 is a fragmentary cross-sectional view of a third modification of the electron emitter according to the second embodiment.

In an electron emitter 10Bc according to a third modification shown in FIG. 36, the upper electrode 14, particularly, the peripheral portion 26 of the through region 20 of the upper electrode 14, may be raised. This configuration may be achieved by including a material which will be gasified in the sintering process in the film material of the upper electrode 14. In the sintering process, the material is gasified, forming a number of through regions 20 in the upper electrode 14 with the peripheral portions 26 of the through regions 20 being raised.

An electron emitter 10C according to a third embodiment will be described below with reference to FIG. 37.

Figure 37:
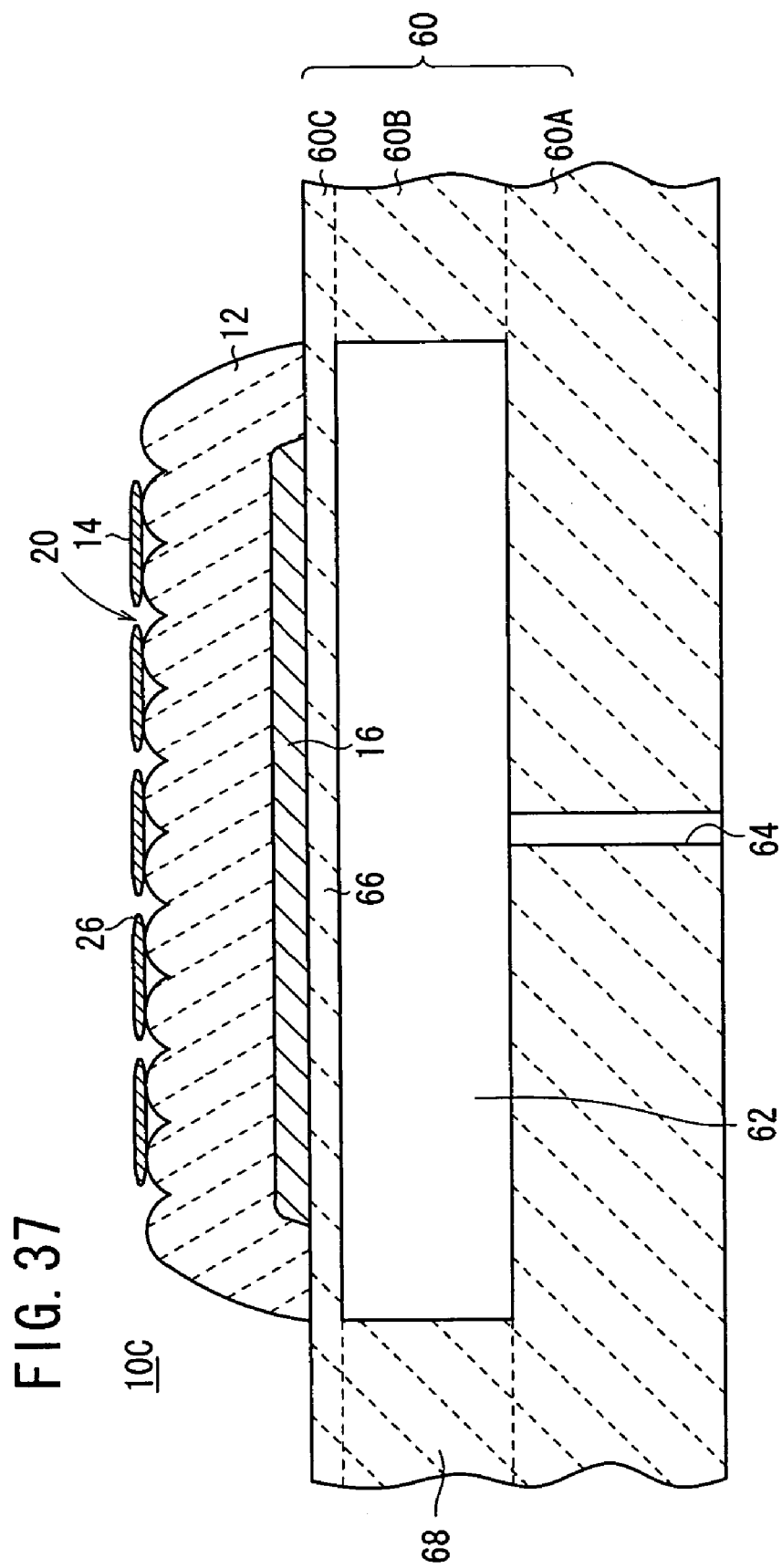
FIG. 37 is a fragmentary cross-sectional view of an electron emitter according to a third embodiment.

As shown in FIG. 37, the electron emitter 10C is of an arrangement that is essentially the same as the electron emitter 10A according to the first embodiment, but differs therefrom in that it has one board 60 made of ceramics, a lower electrode 16 formed on the board 60, an emitter 12 formed on the board 60 in covering relation to the lower electrode 16, and an upper electrode 14 formed on the emitter 12.

The board 60 has a cavity 62 defined in the position corresponding to each emitter 12 and serving part of a thin-wall portion. The cavity 62 communicates with the exterior via a small-diameter through hole 64 which is defined in the opposite end surface of the board 60.

The board 60 includes a thin-wall portion lying over the cavity 62 (hereinafter referred to as "thin-wall portion 66")

and a thick-wall portion other than the thin-wall portion, which functions as a stationary block 68 supporting the thin-wall portion 66.

The board 60 thus constructed may be regarded as a unitary laminated structural body having a lowermost board layer 60A, an intermediate spacer layer 60B, and an uppermost thin layer 60C, with the cavity 62 defined in the spacer layer 60B in alignment with the emitter 12. The board layer 60A functions as both a stiffening board and a wiring board. The board 60 may be of an integrally sintered structure made up of the board layer 60A, the spacer layer 60B, and the thin layer 60C, or may be formed by bonding these layers 60A through 60C.

The thin-wall portion 66 should preferably be made of a highly heat-resistant material for the reason that the thin-wall portion 66 is not modified when at least the emitter 12 is formed if the thin-wall portion 66 is directly supported by the stationary block 68 without using a material of poor heat resistance such as an organic adhesive or the like.

The thin-wall portion 66 should preferably be made of an electrically insulating material in order to provide an electric isolation between an interconnection leading to the upper electrode 14 on the board 60 and an interconnection leading to the lower electrode 16.

Therefore, the thin-wall portion 66 may be made of a highly heat-resistant metal or a material such as an enameled material where a surface of such a highly heat-resistant metal is covered with a ceramic material such as glass or the like. However, ceramics is optimum as the material of the thin-wall portion 66.

The ceramics of the thin-wall portion 66 may be stabilized zirconium oxide, aluminum oxide, magnesium oxide, titanium oxide, spinel, mullite, aluminum nitride, silicon nitride, glass, or a mixture thereof. Among these materials, aluminum oxide and stabilized zirconium oxide are preferable from the standpoint of strength and rigidity. Stabilized zirconium oxide is particularly preferable because it provides relatively high mechanical strength and relatively high tenacity and causes relatively weak chemical reactions with the upper electrode 14 and the lower electrode 16. Stabilized zirconium oxide includes both stabilized zirconium oxide and partially stabilized zirconium oxide. Stabilized zirconium oxide does not cause a phase transition because it has a crystalline structure such as a cubic structure or the like.

Zirconium oxide causes a phase transition in a monoclinic structure and a tetragonal structure at about 1000° C., and may crack upon such a phase transition. Stabilized zirconium oxide contains 1–30 mol % of a stabilizer such as calcium oxide, magnesium oxide, yttrium oxide, scandium oxide, ytterbium oxide, cerium oxide, or an oxide of a rare earth metal. The stabilizer should preferably contain ytterbium oxide in order to increase the mechanical strength of the board 60. In this case, the stabilizer should preferably contain 1.5 to 6 mol % of yttrium oxide, or more preferably 2 to 4 mol t of yttrium oxide, and furthermore should preferably contain 0.1 to 5 mol % of aluminum oxide.

The crystalline phase may be a mixture of cubic and monoclinic systems, a mixture of tetragonal and monoclinic systems, or a mixture of cubic, tetragonal and monoclinic systems. Particularly, a mixture of cubic and monoclinic systems or a mixture of tetragonal and monoclinic systems is most preferable from the standpoint of strength, tenacity, and durability.

If the board 60 is made of ceramics, then it is constructed of many crystal grains. In order to increase the mechanical strength of the board 60, the average diameter of the crystal grains should preferably be in the range from 0.05 to 2 μm and more preferably in the range from 0.1 to 1 μm.

The stationary block 68 should preferably be made of ceramics. The stationary block 68 may be made of ceramics which is the same as or different from the ceramics of the thin-wall portion 66. As with the material of the thin-wall portion 66, the ceramics of the stationary block 68 may be stabilized zirconium oxide, aluminum oxide, magnesium oxide, titanium oxide, spinel, mullite, aluminum nitride, silicon nitride, glass, or a mixture thereof.

The board 60 used in the electron emitter 10C is made of a material containing zirconium oxide as a chief component, a material containing aluminum oxide as a chief component, or a material containing a mixture of zirconium oxide and aluminum oxide as a chief component. Particularly preferable is a material chiefly containing zirconium oxide.

Clay or the like may be added as a sintering additive. Components of such a sintering additive need to be adjusted so that the sintering additive does not contain excessive amounts of materials which can easily be vitrified, e.g., silicon oxide, boron oxide, etc. This is because while these easily vitrifiable materials are advantageous in joining the board 60 to the emitter 12, they promote a reaction between the board 60 and the emitter 12, making it difficult to keep the desired composition of the emitter 12 and resulting in a reduction in the device characteristics.

Specifically, the easily vitrifiable materials such as silicon oxide in the board 60 should preferably be limited to 3% by weight or less or more preferably to 1% by weight or less. The chief component referred to above is a component which occurs at 50% by weight or more.

The thickness of the thin-wall portion 66 and the thickness of the emitter 12 should preferably be of substantially the same level. If the thickness of the thin-wall portion 66 were extremely larger than the thickness of the emitter 12 by at least ten times, then since the thin-wall portion 66 would work to prevent the emitter 12 from shrinking when it is baked, large stresses would be developed in the interface between the emitter 12 and the board 60, making the emitter 12 easy to peel off the board 60. If the thickness of the thin-wall portion 66 is substantially the same as the thickness of the emitter 12, the board 60 (the thin-wall portion 66) is easy to follow the emitter 12 as it shrinks when it is baked, allowing the thin-wall portion 66 and the emitter 12 to be appropriately combined with each other. Specifically, the thickness of the thin-wall portion 66 should preferably be in the range from 1 to 100 μm, more particularly in the range from 3 to 50 μm, and even more particularly in the range from 5 to 20 μm. The thickness of the emitter 12 should preferably be in the range from 5 to 100 μm, more particularly in the range from 5 to 50 μm, and even more particularly in the range from 5 to 30 μm.

The emitter 12 may be formed on the board 60 by any of various thick film forming processes including a screen printing process, a dipping process, a coating process, and an electrophoresis process, or any of various thin film forming processes including an ion beam process, a sputtering process, a vacuum evaporation process, an ion plating process, a chemical vapor deposition (CVD) process, and a plating process.

In the sintering process for the electron emitter 10C, the material of the lower electrode 16, the material of the emitter 12, and the material of the upper electrode 14 may successively stacked on the board 60, and then baked into a unitary structure. Alternatively, each time the lower electrode 16, the emitter 12, and the upper electrode 14 are formed, they may be heated (sintered) into a structure integral with the board 60. Depending on the process by which the upper electrode 14 and the lower electrode 16 are formed, they may not be heated (sintered) so as to be integrally combined with the board 60.

The sintering process for integrally combining the board 60, the emitter 12, the upper electrode 14, and the lower electrode 16 may be carried out at a temperature ranging from 500 to 1400° C., preferably from 1000 to 1400° C. For heating the emitter 12 which is in the form of a film, the emitter 12 should be sintered together with its evaporation source while their atmosphere is being controlled in order to prevent the composition of the emitter 12 from becoming unstable at high temperatures.

The emitter 12 may be covered with an appropriate member for concealing the surface thereof against direct exposure to the sintering atmosphere when the emitter 12 is sintered. The covering member should preferably be made of the same material as the board 60.

With the electron emitter 10C according to the third embodiment, the emitter 12 is shrunk when it is baked. Since stresses produced upon the shrinkage are released through the deformation of the cavity 62, the emitter 12 can be sufficiently densified. As the emitter 12 becomes denser, its withstand voltage becomes higher, and the polarization in the emitter 12 is inverted and changed efficiently, resulting in improved characteristics of the electron emitter 10C.

In the third embodiment described above, a board having a three-layer structure is used as the board 60. According to a modification shown in FIG. 38, an electron emitter 10Ca includes a board 60a having a two-layer structure from which the lowermost board layer 60A is omitted.

The electron emitter according to the present invention is not limited to the above embodiments, but may incorporate various arrangements without departing from the scope of the present invention.

What is claimed is:

1. An electron emitter comprising:
a substance serving as an emitter made of a dielectric material, and a first electrode and a second electrode to which a drive voltage is applied to emit electrons;
said first electrode being formed on a first surface of the substance serving as the emitter;
said second electrode being formed on a second surface of the substance serving as the emitter;
at least said first electrode having a plurality of through regions through which said substance serving as the emitter is exposed, said first electrode having a surface which faces said substance serving as the emitter in peripheral portions of said through regions and which is spaced from said substance serving as the emitter.

2. An electron emitter according to claim 1, wherein at least said first surface of said substance serving as the emitter has surface irregularities due to the grain boundary of the dielectric material, said through regions of the first electrode are formed in regions corresponding to concavities of the surface irregularities due to the grain boundary of the dielectric material.

3. An electron emitter according to claim 1, wherein a maximum angle θ between said first surface of said substance serving as the emitter and said surface of the first electrode which faces said substance serving as the emitter in peripheral portions of said through regions is in the range of $1° \leq \theta \leq 60°$.

4. An electron emitter according to claim 1, wherein a maximum distance d in the vertical direction between said first surface of said substance serving as the emitter and said surface of the first electrode which faces said substance serving as the emitter in peripheral portions of said through regions is in the range of $0 \ \mu m < d \leq 10 \ \mu m$.

5. An electron emitter according to claim 1, further comprising a floating electrode in regions of the first surface of said substance serving as the emitter which correspond to said through regions.

6. An electron emitter according to claim 1, wherein said through regions comprise holes.

7. An electron emitter according to claim 6, wherein said holes have an average diameter in the range from 0.1 μm to 10 μm.

8. An electron emitter according to claim 1, wherein said through regions comprise recesses.

9. An electron emitter according to claim 8, wherein said through regions comprise comb-toothed recesses.

10. An electron emitter according to claim 8, wherein said recesses have an average width in the range from 0.1 μm to 10 μm.

11. An electron emitter according to claim 1, wherein said through regions comprise slits.

12. An electron emitter according to claim 11, wherein said slits have an average width in the range from 0.1 μm to 10 μm.

13. An electron emitter comprising:
a substance serving as an emitter made of a dielectric material;
a first electrode having a bottom surface, only a portion of which is in contact with a first surface of the substance serving as the emitter;
a second electrode formed in contact with a second surface of the substance serving as the emitter; and
at least said first electrode having a plurality of through regions through which said substance serving as the emitter is exposed;
wherein said electron emitter has, in its electrical operation, between said first electrode and said second electrode:
a capacitor due to said substance serving as the emitter; and
a cluster of capacitors formed by said first electrode and said substance serving as the emitter in said through regions of said first electrode.

14. An electron emitter having an electron emission region, wherein the electron emitter changes to a first state in which an amount of positive charges and an amount of negative charges due to the accumulation of electrons caused by applying a negative voltage are in equilibrium with each other,
said electron emitter changes from said first state to a second state in which an amount of negative charges is greater than an amount of positive charges due to the accumulation of further electrons,
said electron emitter changes from said second state to a third state in which an amount of positive charges and an amount of negative charges due to the emission of electrons caused by applying a positive voltage are in equilibrium with each other,
said electron emitter changes from said third state to a state in which an amount of positive charges is greater than an amount of negative charges due to the emission of further electrons, and
said electron emission has characteristics represented by:

$$|V1| < |V2|$$

where V1 represents the voltage applied to the electron emitter to change to said first state and V2 represents the voltage applied to the electron emitter to change to said third state.

15. An electron emitter according to claim 14, wherein $$1.5 \times |V1| < |V2|.$$

16. An electron emitter according to claim 14, wherein the rate of change of the amount of positive charges and the amount of electrons in the first state is represented by $\Delta Q1/\Delta V1$ and the rate of change of the amount of positive charges and the amount of electrons in the third state by $\Delta Q2/\Delta V2$, and the rates are related to each other by:

$$(\Delta Q1/\Delta V1) > (\Delta Q2/\Delta V2).$$

17. An electron emitter according to claim 14, wherein a voltage at which the accumulation of electrons is saturated is represented by V3 and a voltage at which the emission of electrons is started by V4, and the voltages are related to each other by:

$$1 \leq |V4|/|V3| \leq 1.5.$$

18. An electron emitter comprising:
a substance serving as an emitter made of a dielectric material, and a first electrode and a second electrode to which a drive voltage is applied to emit electrons;
wherein a first coercive voltage v1 is applied in one direction between said first electrode and said second electrode changes the electron emitter from a state in which said substance serving as the emitter is polarized in one direction to a state in which the polarization is inverted, and a second coercive voltage v2 is applied in another direction to change the polarization back in said one direction from said last-mentioned state, and the voltages are related to each other by:

$$v1 < 0 \text{ and } v2 > 0, \text{ and } |v1| < |v2|.$$

19. An electron emitter according to claim 18, wherein $$1.5 \times |v1| < |v2|.$$

20. An electron emitter according to claim 18, wherein a rate of change of the polarization when said first coercive voltage is applied is represented by $\Delta q1/\Delta v1$, and a rate of change of the polarization when said second coercive voltage is applied by $\Delta q2/\Delta v2$, and the rates are related to each other by:

$$(\Delta q1/\Delta v1) > (\Delta q2/\Delta v2).$$

21. An electron emitter according to claim 18, wherein a voltage at which the accumulation of electrons is saturated is represented by v3 and a voltage at which the emission of electrons is started is represented by v4, and the voltages are related to each other by:

$$1 \leq |v4|/|v3| \leq 1.5.$$

* * * * *